US010815918B2

(12) United States Patent
Yokono et al.

(10) Patent No.: US 10,815,918 B2
(45) Date of Patent: Oct. 27, 2020

(54) CONTROLLER AND CONTROL METHOD FOR SUPERCHARGER-EQUIPPED INTERNAL COMBUSTION ENGINE

(71) Applicant: Mitsubishi Electric Corporation, Tokyo (JP)

(72) Inventors: Michihisa Yokono, Hyogo (JP); Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 696 days.

(21) Appl. No.: 15/635,345

(22) Filed: Jun. 28, 2017

(65) Prior Publication Data

US 2018/0100456 A1   Apr. 12, 2018

(30) Foreign Application Priority Data

Oct. 11, 2016   (JP) .................................. 2016-199775

(51) Int. Cl.
*F02D 41/00* (2006.01)
*F02B 39/10* (2006.01)
(Continued)

(52) U.S. Cl.
CPC ........ *F02D 41/0007* (2013.01); *F02B 37/004* (2013.01); *F02B 37/04* (2013.01);
(Continued)

(58) Field of Classification Search
CPC ........ F02B 37/04; F02B 37/004; F02B 37/10; F02B 39/10; F02D 41/0007; F02D 41/18
See application file for complete search history.

(56) References Cited

U.S. PATENT DOCUMENTS

| | | | | |
|---|---|---|---|---|
| 6,079,211 A | * | 6/2000 | Woollenweber | F02B 37/04 60/602 |
| 2005/0022525 A1 | | 2/2005 | Ellmer et al. | |

(Continued)

FOREIGN PATENT DOCUMENTS

| | | |
|---|---|---|
| DE | 10202146 A1 | 7/2003 |
| JP | 2016-11641 A | 1/2016 |

(Continued)

OTHER PUBLICATIONS

Communication dated Apr. 29, 2020, from the German Intellectual Property Office in Application No. 102017217796.9.

*Primary Examiner* — Ngoc T Nguyen
(74) *Attorney, Agent, or Firm* — Sughrue Mion, PLLC; Richard C. Turner

(57) ABSTRACT

To provide a controller and a control method for a supercharger-equipped internal combustion engine capable of assisting the insufficient part of supercharging pressure supercharged by the turbocharger, with a good responsiveness by the electric compressor, using simple calculation, even though using a plurality of superchargers. The controller for a supercharger-equipped internal combustion engine calculates, as a target intermediate supercharging pressure, a value subtracting, from the target supercharging pressure, a pressure difference subtracting the actual intermediate supercharging pressure from the actual supercharging pressure; calculates a pressure ratio of the target intermediate supercharging pressure and the actual atmospheric pressure; calculates a target rotational speed of the electric compressor based on the pressure ratio and the actual intake air flow rate; and controls the electric motor.

7 Claims, 9 Drawing Sheets

(51) Int. Cl.
  *F02B 37/04* (2006.01)
  *F02B 37/00* (2006.01)
  *F02B 37/16* (2006.01)
  *F02B 37/18* (2006.01)
  *F02D 41/18* (2006.01)
  *F02D 11/10* (2006.01)
  *F02B 37/12* (2006.01)

(52) U.S. Cl.
  CPC .............. *F02B 37/16* (2013.01); *F02B 37/18* (2013.01); *F02B 39/10* (2013.01); *F02D 41/18* (2013.01); *F02B 2037/122* (2013.01); *F02D 11/10* (2013.01); *F02D 2200/04* (2013.01); *F02D 2200/0402* (2013.01); *F02D 2200/703* (2013.01); *Y02T 10/144* (2013.01)

(56) References Cited

U.S. PATENT DOCUMENTS

2007/0033938 A1* 2/2007 Ueno .................... F02B 37/004
  60/612
2016/0061104 A1* 3/2016 Hirayama ............... F02D 41/12
  60/602
2016/0305353 A1* 10/2016 Sase ......................... F02D 41/30
2017/0002726 A1* 1/2017 Iwamoto ............. F02D 41/0007
2017/0051662 A1* 2/2017 Hagari ................ F02D 41/0007
2017/0051663 A1* 2/2017 Inoue .................. F02D 41/0007

FOREIGN PATENT DOCUMENTS

JP          5963927 B1    8/2016
WO      2016/002964 A1   1/2016

\* cited by examiner

WITHOUT ELECTRIC COMPRESSOR ($P1r > P12r$)
SUPERCHARGING

WITH ELECTRIC COMPRESSOR ($P1r < P12r$)
SUPERCHARGING

CONTROLLER AND CONTROL METHOD FOR SUPERCHARGER-EQUIPPED INTERNAL COMBUSTION ENGINE

INCORPORATION BY REFERENCE

The disclosure of Japanese Patent Application No. 2016-199775 filed on Oct. 11, 2016 including its specification, claims and drawings, is incorporated herein by reference in its entirety.

BACKGROUND

The present invention relates to controller and control method for a supercharger-equipped internal combustion engine that is provided with a turbocharger which has a turbine and a turbo compressor, and an electric supercharger which has an electric compressor driven by an electric motor.

As the control method of the supercharging system applied to the internal combustion engine, there have been proposed the method using the compressor driving force which is calculated based on the passing air flow rate of a turbocharger, the before/after-compressor pressure ratio, and the like (for example, Japanese Patent Publication No. 5963927 (JP 5963927 B)).

In the turbocharger which performs supercharging using exhaust gas energy, since the acceleration delay from a low-speed area becomes a problem, the method for solving the acceleration delay is also proposed by providing the electric compressor, which uses the electric motor for driving force, in an intake path (for example, Japanese Patent Application Publication No. 2016-11641 (JP 2016-11641 A)).

SUMMARY

However, although the technology of JP 5963927 B can deal with the internal combustion engine equipped with the turbocharger, it cannot deal with the internal combustion engine equipped with the electric compressor in addition to the turbocharger. Since the technology of JP 2016-11641 A required determination of many control modes, there was a problem that control was complicated.

Thus, even though it is an internal combustion engine using a plurality of superchargers of a turbocharger and an electric compressor, it is desirable to provide a controller and a control method for a supercharger-equipped internal combustion engine capable of assisting the insufficient part of supercharging pressure supercharged by the turbocharger, with a good responsiveness by the electric compressor, using simple calculation.

A controller for a supercharger-equipped internal combustion engine according to the present invention is a controller for a supercharger-equipped internal combustion engine that is provided with a turbocharger which has a turbine provided in an exhaust path and a turbo compressor which is provided at the upstream side of a throttle valve in an intake path and rotates integrally with the turbine, and an electric supercharger which has an electric compressor provided at the upstream side of the turbo compressor in the intake path and an electric motor which drives the electric compressor, the controller for the supercharger-equipped internal combustion engine includes: a driving condition detection unit that detects an intake air flow rate which flows through the intake path, an atmospheric pressure, an intermediate supercharging pressure which is a pressure at the downstream side of the electric compressor and at the upstream side of the turbo compressor in the intake path, and a supercharging pressure which is a pressure at the downstream side of the turbo compressor and at the upstream side of the throttle valve in the intake path; a target supercharging pressure calculation unit that calculates a target value of the supercharging pressure; and an electric compressor rotational speed control unit that calculates, as a target value of the intermediate supercharging pressure, a value obtained by subtracting, from the target value of the supercharging pressure, a pressure difference obtained by subtracting a detection value of the intermediate supercharging pressure from a detection value of the supercharging pressure; calculates a target before/after-electric compressor pressure ratio which is a ratio of the target value of the intermediate supercharging pressure and a detection value of the atmospheric pressure; calculates a target rotational speed of the electric compressor based on the target before/after-electric compressor pressure ratio and a detection value of the intake air flow rate; and controls the electric motor so that a rotational speed of the electric compressor approaches the target rotational speed of the electric compressor.

A control method for a supercharger-equipped internal combustion engine according to the present invention is a control method for a supercharger-equipped internal combustion engine that is provided with a turbocharger which has a turbine provided in an exhaust path and a turbo compressor which is provided at the upstream side of a throttle valve in an intake path and rotates integrally with the turbine, and an electric supercharger which has an electric compressor provided at the upstream side of the turbo compressor in the intake path and an electric motor Which drives the electric compressor, the control method for the supercharger-equipped internal combustion engine includes: detecting an intake air flow rate which flows through the intake path, an atmospheric pressure, an intermediate supercharging pressure which is a pressure at the downstream side of the electric compressor and at the upstream side of the turbo compressor in the intake path, and a supercharging pressure which is a pressure at the downstream side of the turbo compressor and at the upstream side of the throttle valve in the intake path; calculating a target value of the supercharging pressure; and calculating, as a target value of the intermediate supercharging pressure, a value obtained by subtracting, from the target value of the supercharging pressure, a pressure difference obtained by subtracting a detection value of the intermediate supercharging pressure from a detection value of the supercharging pressure; calculating a target before/after-electric compressor pressure ratio which is a ratio of the target value of the intermediate supercharging pressure and a detection value of the atmospheric pressure; calculating a target rotational speed of the electric compressor based on the target before/after-electric compressor pressure ratio and a detection value of the intake air flow rate; and controlling the electric motor so that a rotational speed of the electric compressor approaches the target rotational speed of the electric compressor.

According to the controller and the control method for the supercharger-equipped internal combustion engine concerning the present invention, by the pressure difference obtained by subtracting the detection value of intermediate supercharging pressure from the detection value of supercharging pressure, the actual pressure difference actually supercharged by the turbo compressor is calculated. Then, by subtracting the actual pressure difference of the turbo compressor from the target supercharging pressure at the downstream side of the turbo compressor, the target value of the intermediate supercharging pressure which the electric compressor needs to supercharge for realizing the target supercharging pressure is calculated; and based on the target value of intermediate supercharging pressure, the target value of the before/after-electric compressor pressure ratio which needs to be achieved by an electric compressor can be calculated. Then, under the condition of the actual intake air flow rate which passes the electric compressor, the target rotational speed of the electric compressor for realizing the target before/after-electric compressor pressure ratio is calculated; and by the electric motor having a quick response, the electric compressor can be controlled to the target rotational speed. Therefore, by simple calculation using pressure information, the insufficient part of the supercharging pressure of the turbo compressor which occurred by the response delay of the turbocharger after the acceleration demand can be assisted with a good responsiveness by the electric compressor; and the acceleration responsiveness can be improved.

DETAILED DESCRIPTION OF THE EMBODIMENTS

Embodiment 1

Figure 1:
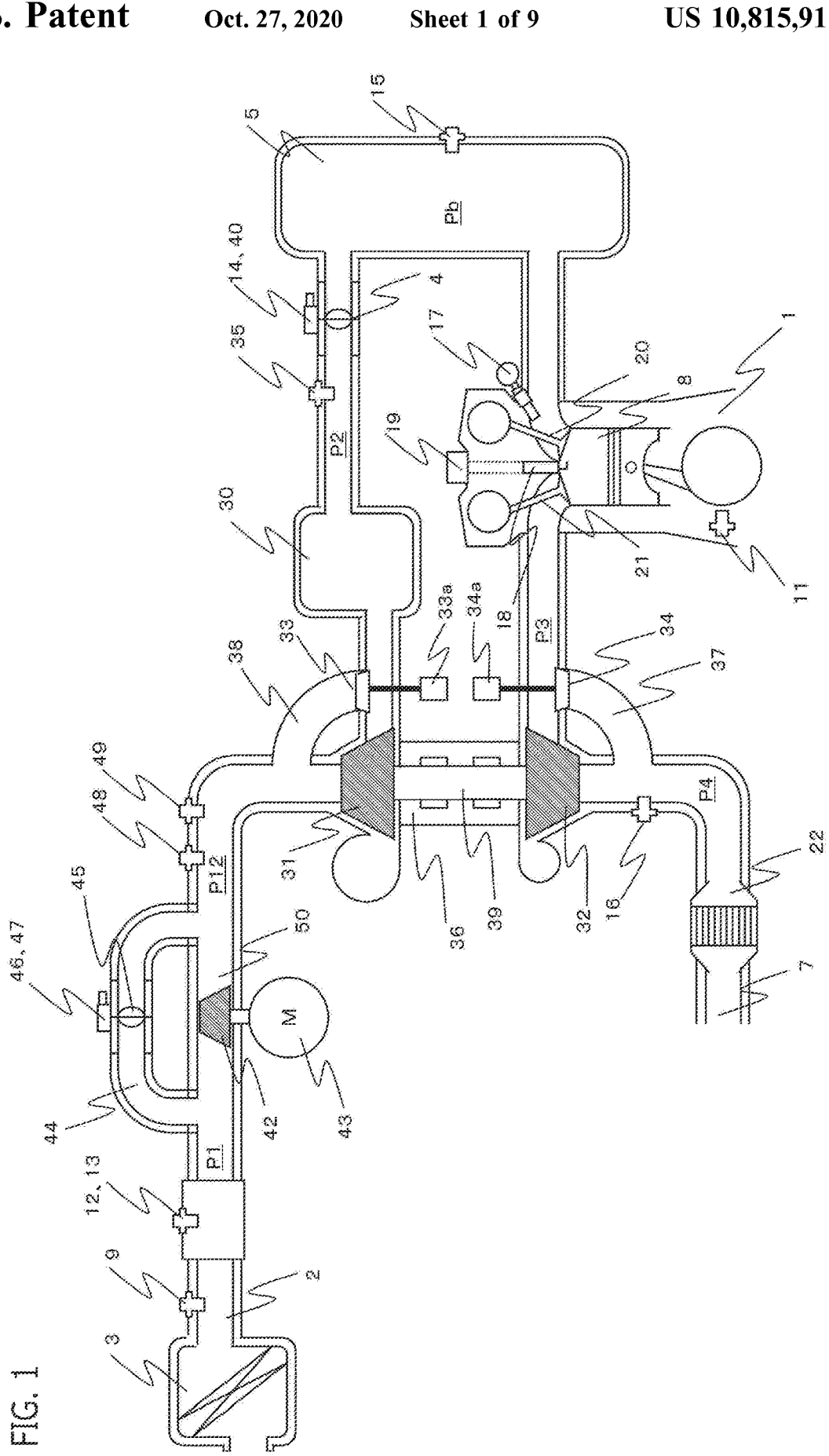
FIG. 1 is a schematic configuration diagram of a supercharger-equipped internal combustion engine according to Embodiment 1 of the present invention.
Figure 2:
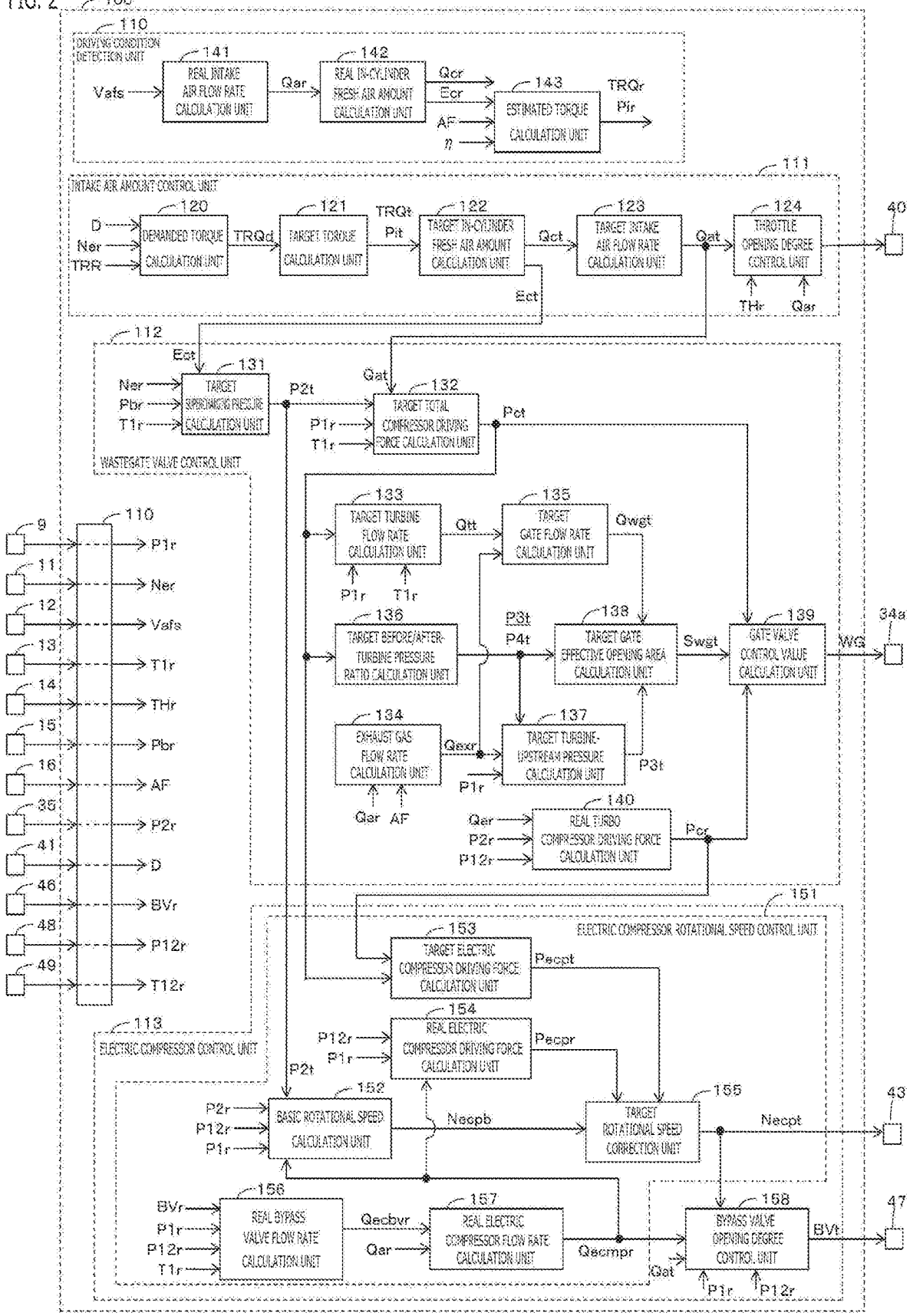
FIG. 2 is a block diagram of the controller for the supercharger-equipped internal combustion engine according to Embodiment 1 of the present invention.

A controller 100 for a supercharger-equipped internal combustion engine 1 (hereinafter, referred to simply as a engine 1) according to Embodiment 1 will be explained with reference to the drawings. The engine 1 is provided with two superchargers of a turbocharger 36 and an electric supercharger 50. FIG. 1 is a schematic configuration diagram of the engine 1 according to the present embodiment; FIG. 2 is a block diagram of the controller 100 according to the present embodiment.

1. Configuration of Engine 1

The configuration of the engine 1 will be explained. As illustrated in FIG. 1, the engine 1 has a cylinder 8 in which a fuel-air mixture is combusted. The engine 1 and the controller 100 are mounted in a vehicle; the engine 1 functions as a driving force source for the vehicle (wheels). The engine 1 has an intake path 2 for supplying air to the cylinder 8 and an exhaust path 7 for discharging exhaust gas from the cylinder 8. The intake path 2 is formed of an intake pipe and the like; the exhaust path 7 is formed of an exhaust pipe and the like. The intake path 2 has an intake manifold 5 for supplying air to the respective cylinders 8. A throttle valve 4 is provided at a position, in the intake path 2, which is at the upstream side of the intake manifold 5. Accordingly, the intake path 2 at the downstream side of the throttle valve 4 is formed of the intake manifold 5.

The engine 1 is provided with the turbocharger 36. The turbocharger 36 has a turbine 32 provided in the exhaust path 7, and a turbo compressor 31 which is a compressor provided at the upstream side of the throttle valve 4 in the intake path 2 and rotates integrally with the turbine 32. And, the turbocharger 36 has a turbine bypass 37 which bypasses the turbine 32, a wastegate valve 34 which opens and closes the turbine bypass 37, and a gate valve actuator 34a which drives the wastegate valve 34. The turbine bypass 37 is a flow path which bypasses the turbine 32 and connects the portion, of the exhaust path 7, which is at the upstream side of the turbine 32 with the portion, of the exhaust path 7, which is at the downstream side of the turbine 32.

When exhaust gas drives and rotates the turbine 32, the turbo compressor 31 rotates integrally with the turbine 32, compresses air in the intake path 2, and transmits the air to the cylinder 8. The turbine 32 and the turbo compressor 31 are coupled with each other by a turbine shaft 39 in such a way as to integrally rotate on the same axis. When the opening degree of the wastegate valve 34 is increased through the gate valve actuator 34a, a wastegate flow rate, out of the exhaust gas flow rate to be exhausted from the engine 1 (cylinder 8), increases; the wastegate flow rate is the flow rate of part of the exhaust gas, which bypasses the turbine 32 so as to flow in the turbine bypass 37. As a result, a turbine flow rate, which is the flow rate of exhaust gas that flows into the turbine 32, decreases. Accordingly, the rotation driving forces of the turbine 32 and the turbo compressor 31 are weakened. The gate valve actuator 34a is an electric one which changes the opening degree of the wastegate valve 34 through the rotation driving force of an electric motor. The gate valve actuator 34a may be a pressure-type one in which a diaphragm is supplied with a pressure obtained by reducing a supercharging pressure P2 by a decompression amount adjusted through a solenoid valve and then the driving force of the diaphragm changes the opening degree of the wastegate valve 34.

The turbocharger 36 has a turbo compressor bypass 38 which bypasses the turbo compressor 31, a turbo compressor bypass valve 33 which opens and closes the turbo compressor bypass 38, and a turbo compressor valve actuator 33a which drives the turbo compressor bypass valve 33. The turbo compressor valve actuator 33a is a pressure-type one having a diaphragm which is actuated by a pressure difference between a supercharging pressure P2 and a manifold pressure Pb. When the supercharging pressure P2 increases to exceed a predetermined pressure difference from the manifold pressure Pb, the diaphragm is activated and hence the turbo compressor bypass valve 33 is opened; thus, the upstream side and the downstream side of the turbo compressor 31 are connected. Accordingly, it is made possible to prevent mechanical damage to an intake pipe or the like caused by an abnormal rise of the supercharging pressure P2 at a time when the accelerator pedal is released. While an after-mentioned wastegate valve control unit 112 controls the opening degree of the wastegate valve 34, the turbo compressor bypass valve 33 is basically closed.

The engine 1 is provided with the electric supercharger 50. The electric supercharger 50 has an electric compressor 42 which is a compressor provided at the upstream side of the turbo compressor 31 in the intake path 2, and an electric motor 43 (hereinafter, referred to a compressor driving motor 43) which drives the electric compressor 42. In the present embodiment, the compressor driving motor 43 is a permanent magnet synchronous motor. The compressor driving motor 43 has a rotor to which permanent magnets were attached, and a stator to which windings were attached. A shaft of the rotor is connected with the electric compressor 42. The compressor driving motor 43 is provided with an inverter and a motor controller. The motor controller changes a motor output by controlling the inverter so that a rotational speed of the rotor approaches a target rotational speed Necpt of the electric compressor 42 transmitted from the controller 100. The motor controller detects the rotational speed of the rotor by a rotation speed sensor and the like. For the compressor driving motor 43, the other kind of electric motor, such as a DC brush-less motor and an induction motor, may be used.

The electric supercharger 50 includes an electric compressor bypass 44 which bypasses the electric compressor 42, an electric compressor bypass valve 45 which opens and closes the electric compressor bypass 44, and an electric compressor valve actuator 47 which drives the electric compressor bypass valve 45. The electric compressor bypass 44 is a flow path which bypasses of the electric compressor 42 and connects the portion of the intake path 2, which is at the upstream side of the electric compressor 42, with the portion of the intake path 2, which is at the downstream side of the electric compressor 42. The electric compressor valve actuator 47 is an electric one which changes the opening degree of the electric compressor bypass valve 45 through the rotational driving force of an electric motor. The electric compressor bypass valve 45 is connected with an electric compressor valve position sensor 46 which generates an electric signal corresponding to an opening degree of the electric compressor bypass valve 45. The electric compressor valve actuator 47 may be a pressure-type one in which a diaphragm is supplied with a pressure obtained by reducing an intermediate supercharging pressure P12 by a decompression amount adjusted through a solenoid valve and then the driving force of the diaphragm changes the electric compressor bypass valve 45.

An air cleaner 3 for purifying taken-in outer air is mounted at the most upstream side of the intake path 2. At a position which is at the downstream side (the side closer to the cylinder 8) of the air cleaner 3 and at the upstream side of the electric compressor 42 in the intake path 2, an air flow sensor 12, which generates an electric signal corresponding to an intake air flow rate Qa, and an intake air temperature sensor 13, which generates an electric signal corresponding to an intake air temperature T1 in the intake path 2, are provided, as discrete components or as an integrated component (as an integrated component, in this example). An atmospheric pressure sensor 9, which generates an electric signal corresponding to an atmospheric pressure P1, is provided at a position which is at the downstream side of the air cleaner 3 and at the upstream side of the electric compressor 42 in the intake path 2. The pressure at the upstream side of the electric compressor 42 can be regarded as being equal to the atmospheric pressure P1. The atmospheric pressure sensor 9 may be contained in the controller 100.

At a position which is at a downstream side of the electric compressor 42 and at the upstream side of the turbo compressor 31 in the intake path 2, an intermediate supercharging pressure sensor 48 which is a pressure sensor which generates an electric signal corresponding to the intermediate supercharging pressure P12, and an intermediate supercharge temperature sensor 49 which is a temperature sensor which generates an electric signal corresponding to an intermediate supercharge temperature T12 are provided. The intermediate supercharging pressure P12 is a pressure of the intake air at the downstream side of the electric compressor 42 and at the upstream side of the turbo compressor 31 in the intake path 2. The intermediate supercharge temperature T12 is a temperature of the intake air at the downstream side of the electric compressor 42 and at the upstream side of the turbo compressor 31 in the intake path 2. The intermediate supercharging pressure sensor 48 and the intermediate supercharge temperature sensor 49 may be an integrated component, or may be discrete components. The intermediate supercharging pressure P12 and the intermediate supercharge temperature T12 may be estimated values for which various kinds of control information was used.

An intercooler 30 for cooling compressed air is provided at the downstream side of the turbo compressor 31 in the intake path 2. The throttle valve 4 for adjusting an air amount to be taken in by the engine 1 is provided at the downstream side of the intercooler 30. The throttle valve 4 is opened and closed by a throttle motor 40. The throttle valve 4 is connected with a throttle position sensor 14 which generates an electric signal corresponding to a throttle opening degree.

At a position which is at the downstream side of the turbo compressor 31 and at the upstream side of the throttle valve 4 in the intake path 2, a supercharging pressure sensor 35 which is a pressure sensor which generates an electric signal corresponding to the supercharging pressure P2 is provided. The supercharging pressure P2 is a pressure of the intake air at the downstream side of the turbo compressor 31 and at the upstream side of the throttle valve 4 in the intake path 2.

The part of the intake path 2 which is at the downstream side of the throttle valve 4 constitutes the intake manifold 5, which functions also as a surge tank for suppressing an intake air ripple. A manifold pressure sensor 15 which generates an electric signal corresponding to the manifold pressure Pb, which is the pressure of intake air in the intake manifold 5, is provided in the intake manifold 5. Unlike the present embodiment in which both the air flow sensor 12 and the manifold pressure sensor 15 are provided, the engine 1 may be provided only with the manifold pressure sensor 15 but with no air flow sensor 12. In the case where only the manifold pressure sensor 15 is provided, it may be allowed that the intake air temperature sensor 13 is provided in the intake manifold 5 so as to detect the intake air temperature inside the intake manifold 5.

An injector 17 for injecting a fuel is provided at the downstream portion of the intake manifold 5. The injector 17 may be provided in such a way as to inject a fuel directly into the cylinder 8. In the top portion of the cylinder 8, there are provided an ignition plug 18 for igniting an inflammable fuel-air mixture produced by mixing air taken into the cylinder 8 with a fuel injected from the injector 17, and an ignition coil 19 for generating energy with which the ignition plug 18 throws sparks. There are also provided an intake valve 20 for adjusting the intake air amount to be taken from the intake path 2 into the cylinder 8 and an exhaust valve 21 for adjusting the exhaust gas amount to be exhausted from the cylinder 8 to the exhaust path 7. On the crankshaft of the engine 1, there is provided a crank angle sensor 11 for generating an electric signal corresponding to the rotation angle of the engine 1.

An exhaust gas purification catalyst 22 is provided at the downstream side of the turbine 32 in the exhaust path 7. At a position which is at the downstream side of the turbine 32 and at the upstream side of the exhaust gas purification catalyst 22 in the exhaust path 7, there is provided an air-fuel ratio sensor 16 which generates an electric signal corresponding to an air-fuel ratio AF, which is the ratio of air to fuel in a combustion gas.

2. The Configuration of the Controller 100

Figure 3:
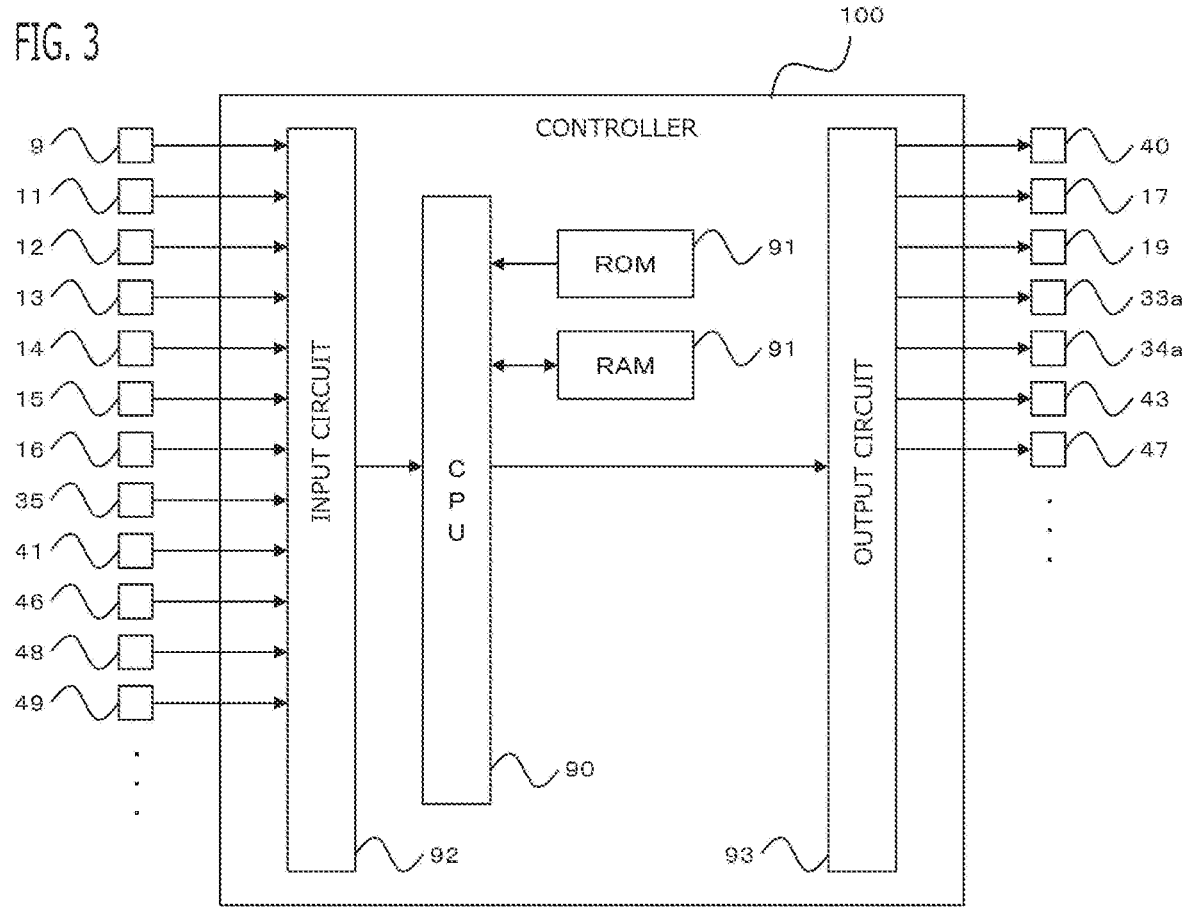
FIG. 3 is a hardware configuration diagram of the controller for the supercharger-equipped internal combustion engine according to Embodiment 1 of the present invention.

Next, the configuration of the controller 100 will be explained. The controller 100 is a controller whose control subject is the engine 1 equipped with the turbocharger 36 and the electric supercharger 50. As shown in FIG. 2, the controller 100 is provided with control units such as a driving condition detection unit 110, an intake air control unit 111, a wastegate valve control unit 112, and an electric compressor control unit 113. Respective control units 110 through 113 and the like provided in the controller 100 are realized by processing circuits included in the controller 100. Specifically, as shown in FIG. 3, the controller 100 includes, as a processing circuit, a computing processing unit (computer) 90 such as a CPU (Central Processing Unit), storage apparatuses 91 which exchange data with the computing processing unit 90, an input circuit 92 which inputs external signals to the computing processing unit 90, an output circuit 93 which outputs signals from the computing processing unit 90 to the outside, and the like. As the storage apparatuses 91, there are provided a RAM (Random Access Memory) which can read data and write data from the computing processing unit 90, a ROM (Read Only Memory) which can read data from the computing processing unit 90, and the like. The input circuit 92 is connected with various kinds of sensors and switches and is provided with an A/D converter, an input port, and the like for inputting output signals from the sensors and the switches to the computing processing unit 90. The output circuit 93 is connected with electric loads and is provided with a driving circuit, an output port, and the like for outputting a control signal from the computing processing unit 90 to the electric loads. Then, the computing processing unit 90 runs software items (programs) stored in the storage apparatus 91 such as a ROM and collaborates with other hardware devices in the controller 100, such as the storage apparatus 91, the input circuit 92, and the output circuit 93, so that the respective functions of the control units 110 through 113 included in the controller 100 are realized. Setting data items such as maps data to be utilized in the control units 110 through 113 are stored, as part of software items (programs), in the storage apparatus 91 such as a ROM.

In the present embodiment, the input circuit 92 is connected with various kinds of sensors such as the atmospheric pressure sensor 9, the crank angle sensor 11, the air flow sensor 12, the intake air temperature sensor 13, the throttle position sensor 14, the manifold pressure sensor 15, the air-fuel ratio sensor 16, the supercharging pressure sensor 35, an accelerator position sensor 41 for generating an electric signal corresponding to an accelerator operating amount, the electric compressor valve position sensor 46, the intermediate supercharging pressure sensor 48, and the intermediate supercharge temperature sensor 49. The output circuit 93 is connected with various kinds of actuators such as the throttle motor 40, the injector 17, the ignition coil 19, the turbo compressor valve actuator 33a, the gate valve actuator 34a, the compressor driving motor 43, and the electric compressor valve driving motor 47. Although not shown, the input circuit 92 is connected with sensors for controlling the combustion in the engine 1 and sensors for controlling the behavior of the vehicle (e.g., a vehicle speed sensor, a water temperature sensor, and the like).

As basic control, the controller 100 calculates the fuel injection amount and the ignition timing, based on inputted output signals and the like from the various kinds of sensors so as to perform driving control of a fuel ignition apparatus, an ignition apparatus, and the like (not shown). Although the details will be explained later, based on the output signal of the accelerator position sensor 41 and the like, the controller 100 calculates a demanded output torque demanded on the engine 1, and then controls the throttle valve 4, the wastegate valve 34, The electric compressor 42, the electric compressor bypass valve 45 and the like so that an intake air amount for realizing the demanded output torque is obtained.

2-1. Driving Condition Detection Unit 110

The controller 100 is provided with the driving condition detection unit 110 that detects the driving conditions of the engine 1 and the vehicle. The driving condition detection unit 110 detects an actual rotation speed Ner of the engine 1, an actual intake air flow rate Qar, and an actual atmospheric pressure $P1r$. Specifically, the driving condition detection unit 110 detects the actual rotation speed Ner of the engine 1, based on the output signal of the crank angle sensor 11, detects the actual intake air flow rate Qar of the engine 1, based on the output signal of the air flow sensor 12 or the manifold pressure sensor 15, and detects the actual atmospheric pressure $P1r$, based on the output signal of the atmospheric pressure sensor 9. In the configuration shown in FIG. 2, it is a method which detects the actual intake air flow rate Qar of the engine 1 based on the output signal of the air flow sensor 12.

Here, "an actual XX" means "a detection value of XX", for example, "an actual intake air flow rate" means "a detection value of an intake air flow rate". "A target XX" means "a target value of XX", for example, "a target intake air flow rate" means "a target value of an intake air flow rate".

In addition to the foregoing driving conditions, the driving condition detection unit 110 detects various kinds of driving conditions such as an actual intake air temperature $T1r$, an actual throttle opening degree THr, an actual manifold pressure Pbr, an exhaust gas air-fuel ratio AF, an actual supercharging pressure $P2r$, an accelerator opening degree D, an actual opening degree BVr of the electric compressor bypass valve, an actual intermediate supercharging pressure $P12r$, and an actual intermediate supercharge temperature $T12r$. Specifically, the driving condition detection unit 110 detects the actual intake air temperature $T1r$, based on the output signal of the intake air temperature sensor 13; detects the actual throttle opening degree THr, based on the output signal of the throttle position sensor 14; detects the actual manifold pressure Pbr, based on the output signal of the manifold pressure sensor 15; detects the exhaust gas air-fuel ratio AF, based on the output signal of the air-fuel ratio sensor 16; detects the actual supercharging pressure $P2r$, based on the output signal of the supercharging pressure sensor 35; detects the accelerator opening degree D, based on the output signal of the accelerator position sensor 41; detects the actual opening degree BVr of the electric compressor bypass valve, based on the output signal of the electric compressor valve position sensor 46; detects the actual intermediate supercharging pressure P12r, based on the output signal of the intermediate supercharging pressure sensor 48; and detects the actual intermediate supercharge temperature T12r, based on the output signal of the intermediate supercharge temperature sensor 49.

<Real Intake Air Flow Rate Calculation Unit 141>

The driving condition detection unit 110 is provided with an actual intake air flow rate calculation unit 141. The actual intake air flow rate calculation unit 141 calculates the actual intake air flow rate Qar, which is the flow rate of air that is taken in by the engine 1 (the intake path 2). In the present embodiment, based on an actually measured air flow rate Qr detected through the output signal Vafs of the air flow sensor 12 or the manifold pressure sensor 15 (in this example, the air flow sensor 12), the actual intake air flow rate calculation unit 141 calculates, as the actual intake air flow rate Qar[g/s], an average value of the actually measured air flow rate Qr in a stroke period ΔT (in this example, the interval of BTDC5degCA), as represented by the equation (1) below.

$$Qar = \Sigma Qr/N \quad (1)$$

Where N denotes the number of sampling instances for the actually measured air flow rate Qr in the stroke period ΔT. In the case of detecting the actually measured air flow rate Qr based on the actual manifold pressure Pbr detected by the manifold pressure sensor 15, the driving condition detection unit 110 calculates the actually measured air flow rate Qr by use of an orifice flow rate calculation equation represented by the equation (14) or the like.

<Real in-Cylinder Fresh Air Amount Calculation Unit 142>

The driving condition detection unit 110 is provided with an actual in-cylinder fresh air amount calculation unit 142. Based on the output signal of the air flow sensor 12 or the manifold pressure sensor 15 (in this example, the air flow sensor 12), the actual in-cylinder fresh air amount calculation unit 142 calculates an actual charging efficiency Ecr and an actual in-cylinder fresh air amount Qcr. In the present embodiment, as shown in the equation (2) below, the actual in-cylinder fresh air amount calculation unit 142 calculates the actual in-cylinder fresh air amount Qcr per stroke [g/stroke] by applying first-order-lag filter processing, which simulates a delay in the intake manifold 5 (surge tank), to a value obtained by multiplying the actual intake air flow rate Qar by the stroke period ΔT (in this example, the interval of BTDC5degCA). Where KCCA is a filter coefficient.

$$Qcr(n) = KCCA \times Qcr(n-1) + (1-KCCA) \times Qar(n) \times \Delta T(n) \quad (2)$$

Alternatively, as shown in the equation (3) below, the actual in-cylinder fresh air amount calculation unit 142 may calculate a volume of air, in the intake manifold 5, which has been taken in by the cylinder 8, by multiplying a volumetric efficiency Kv on the basis of the intake manifold 5 by a cylinder volume Vc; and then calculates the actual in-cylinder fresh air amount Qcr[g/stroke] by multiplying the calculated air volume by an air density pb, which is calculated based on the actual manifold pressure Pbr and the actual intake air temperature T1r. Where the volumetric efficiency Kv is the ratio of the volume of air, in the intake manifold 5, which is taken in by the cylinder, to the cylinder volume Vc (Kv=the volume of air in the intake manifold 5 taken in by the cylinder 8/Vc). By use of a map data in which the relationship among the rotation speed Ne, the manifold pressure Pb, and the volumetric efficiency Kv is preliminarily set, the actual in-cylinder fresh air amount calculation unit 142 calculates the volumetric efficiency Kv corresponding to the actual rotation speed Ner and the actual manifold pressure Pbr. Where R is a gas constant.

$$Qcr = (Kv \times Vc) \times \rho b, \rho b = Pbr/(R \times T1r) \quad (3)$$

As shown in the equation (4) below, the actual in-cylinder fresh air amount calculation unit 142 calculates the actual charging efficiency Ecr by dividing the actual in-cylinder fresh air amount Qcr by a value obtained by multiplying the density ρ0 of air under the standard atmospheric condition by the cylinder volume Vc. The actual charging efficiency Ecr is the ratio of the actual in-cylinder fresh air amount Qcr to the density (ρ0×Vc) of air under the standard atmospheric condition, with which the cylinder volume Vc is filled. The standard atmospheric condition denotes the state of 1 atm and 25° C.

$$Ecr = Qcr/(\rho 0 \times Vc) \quad (4)$$

<Estimated Torque Calculation Unit 143>

Based on the actual charging efficiency Ecr, the air-fuel ratio AF, and the thermal efficiency η, the estimated torque calculation unit 143 performs calculation for estimating real torque generated by the engine 1, i.e., calculates an estimated output torque TRQr of the engine 1 or an estimated indicated mean effective pressure Pir. In this situation, the air-fuel ratio AF may be the air-fuel ratio of exhaust gas, which is detected by the air-fuel ratio sensor 16, or may be a target value of the air-fuel ratio AF to be utilized for calculating the driving time for the injector 17.

In the present embodiment, based on the actual in-cylinder fresh air amount Qcr per stroke and the air-fuel ratio AF, the estimated torque calculation unit 143 calculates a fuel amount per stroke Qf [g], as shown in the equation (5) below.

$$Qf = Qcr/AF \quad (5)$$

Based on the heat generation amount per unit mass (e.g., approximately 44[MJ/kg], in the case of gasoline) of a fuel to be utilized in the engine 1, the estimated torque calculation unit 143 calculates a heat generation amount Ht [J] from the fuel amount per stroke Qf, as shown in the equation (6) below.

$$Ht = Qf \times 44000 \quad (6)$$

The estimated torque calculation unit 143 calculates the thermal efficiency η [%] of the engine 1. The estimated torque calculation unit 143 calculates the thermal efficiency η corresponding to the actual rotation speed Ner and the actual charging efficiency Ecr, by use of a map data in which the relationship among the rotation speed Ne, the charging efficiency Ec, and the thermal efficiency η is preliminarily set, based on experimental data preliminarily measured with regard to the engine 1. Based on the heat generation amount Ht and the thermal efficiency η, the estimated torque calculation unit 143 calculates an actual indicated work Wi[J], which is work that combustion gas performs for the piston in the cylinder 8, as shown in the equation (7) below.

$$Wi = Ht \times \eta \quad (7)$$

As shown in the equation (8) below, the estimated torque calculation unit 143 calculates the estimated indicated mean effective pressure Pir [kPa] by dividing the actual indicated work Wi [J] by the cylinder volume Vc.

$$Pir = Wi/Vc \quad (8)$$

By rearranging the equations (5) through (8), the equation (9) below is given.

$$Pir = Wi/Vc \quad (9)$$
$$= (Ht \times eta)/Vc$$
$$= (Qf \times 44000 \times \eta)/Vc$$
$$= \{(Qcr/AF) \times 44000 \times \eta\}/Vc$$

In this situation, when in the equation (9), the actual in-cylinder fresh air amount Qcr is replaced by a target in-cylinder fresh air amount Qct and the estimated indicated mean effective pressure Pir is replaced by a target indicated mean effective pressure Pit, the equation (9) is expressed by the equation (10); by rearranging the equation (10) with regarding to the target in-cylinder fresh air amount Qct, the equation (12), described later, is given.

$$Pit = \{(Qct/AF) \times 44000 \times \eta\}/Vc \quad (10)$$

Then, based on the estimated indicated mean effective pressure Pir [kPa], the estimated torque calculation unit 143 calculates the estimated output torque TRQr [Nm], as shown in the equation (11) below. In the equation (11), z is the number of cylinders, and i is the number of rotations per cycle (e.g., i=2, in the case of a 4-stroke engine).

$$TRQr = Pir \times Vc \times z/(2\pi \times i) \quad (11)$$

As described above, by utilizing the actual in-cylinder fresh air amount Qcr, the estimated output torque TRQr can accurately be calculated.

2-2. Intake Air Control Unit 111

The intake air control unit 111 controls intake air of the engine 1. The intake air control unit 111 calculates a target intake air flow rate Qat, which is a target value of the intake air flow rate Qa, and a target charging efficiency Ect, which is a target value of the charging efficiency Ec. In the present embodiment, the intake air control unit 111 includes a demanded torque calculation unit 120 that calculates a demanded output torque TRQd, which is the output torque demanded on the engine 1, a target torque calculation unit 121 that calculates a target output torque TRQt or a target indicated mean effective pressure Pit, based on the demanded output torque TRQd, a target in-cylinder fresh air amount calculation unit 122 that calculates the target charging efficiency Ect and the target in-cylinder fresh air amount Qct, based on the target output torque TRQt or the target indicated mean effective pressure Pit, a target intake air flow rate calculation unit 123 that calculates the target intake air flow rate Qat, based on the target in-cylinder fresh air amount Qct, and a throttle opening degree control unit 124 that controls the throttle opening degree, based on the target intake air flow rate Qat. Hereinafter, the control units 120 through 124 in the intake air control unit 111 will be explained in detail.

<Demanded Torque Calculation Unit 120>

The demanded torque calculation unit 120 calculates the demanded output torque TRQd, based on the accelerator opening degree D and a demand from an external controller. Based on the actual rotation speed Ner (or a traveling speed VS of the vehicle) and the accelerator opening degree D, the demanded torque calculation unit 120 calculates a driver-demanded output torque, which is an output torque of the engine 1 which is demanded by the driver of the vehicle. Specifically, by use of a map data in which the relationship among the actual rotation speed Ner (or the traveling speed VS), the accelerator opening degree D, and the driver-demanded output torque is preliminarily set, the demanded torque calculation unit 120 calculates driver-demanded output torque corresponding to the actual rotation speed Ner (or the traveling speed VS) and the accelerator opening degree D.

An external controller (e.g., a transmission controller, a brake controller, a controller for traction control, or the like) inputs an external demanded output torque TRR to the controller 100. In accordance with the driving condition, the demanded torque calculation unit 120 selects one of the driver-demanded output torque and the external demanded output torque TRR and then outputs the selected torque, as the demanded output torque TRQd. The demanded output torque TRQd denotes the demanded value of torque outputted from the crankshaft of the engine 1. In order to change the acceleration-response characteristic of the vehicle, the demanded torque calculation unit 120 may apply first-order-advance compensation or first-order-lag compensation to the demanded output torque TRQd.

<Target Torque Calculation Unit 121>

The target torque calculation unit 121 calculates the target output torque TRQt or the target indicated mean effective pressure Pit, based on the demanded output torque TRQd. The target torque calculation unit 121 calculates a load of an engine auxiliary apparatus corresponding to the actual driving condition such as the actual rotation speed Ner, by use of a map data in which the relationship between the driving condition such as the rotation speed Ne and the load of the engine auxiliary apparatus is preliminarily set, based on experimental data obtained by measuring the respective loads of various kinds of engine auxiliary apparatuses (e.g., an alternator, an air conditioner compressor, a power steering pump, a transmission pump, a torque converter, and the like). The target torque calculation unit 121 adds the load (an absolute value) of an engine auxiliary apparatus to the demanded output torque TRQd so as to output an engine demanded output torque at a time when the load of an engine auxiliary apparatus is taken into consideration.

Next, the target torque calculation unit 121 calculates engine loss corresponding to the actual driving condition such as the actual rotation speed Ner, by use of a map data in which the relationship between the driving condition such as the rotation speed Ne and the engine loss is preliminarily set, based on real data obtained by measuring mechanical loss and pumping loss inherent in the engine 1 (collectively, referred to as engine loss). Then, the target torque calculation unit 121 adds the engine loss (an absolute value) to the engine demanded output torque so as to calculate the target indicated mean effective pressure Pit to be produced in the cylinder 8. The target torque calculation unit 121 may calculate the target output torque TRQt, instead of the target indicated mean effective pressure Pit.

<Target In-Cylinder Fresh Air Amount Calculation Unit 122>

The target in-cylinder fresh air amount calculation unit 122 calculates the target in-cylinder fresh air amount Qct and the target charging efficiency Ect, based on the target indicated mean effective pressure Pit or the target output torque TRQt. The target in-cylinder fresh air amount calculation unit 122 calculates the target in-cylinder fresh air amount Qct[g/stroke] and the target charging efficiency Ect, based on the target indicated mean effective pressure Pit or the target output torque TRQt, the target value of the air-fuel ratio AF, and the thermal efficiency η. As the thermal efficiency η, a thermal efficiency to be calculated by the estimated torque calculation unit 143, described above, is utilized. The cylinder volume Vc denotes a stroke volume [L] per one cylinder of the cylinder 8.

As shown in the equation (12) below, the target in-cylinder fresh air amount calculation unit 122 calculates the target in-cylinder fresh air amount Qct and the target charging efficiency Ect, based on the target indicated mean effective pressure Pit, the target value of the air-fuel ratio AF, and the thermal efficiency η. The equation (12) is derived from the equation (10) in such a manner as described above.

$$Qct = AF \times Pit \times Vc/(\eta \times 44000)$$

$$Ect = AF \times Pit/(\eta \times 44000 \times \rho 0) \quad (12)$$

The target in-cylinder fresh air amount calculation unit 122 may calculate the target charging efficiency Ect by dividing the target in-cylinder fresh air amount Qct by the preliminarily set mass (ρ0×Vc) of air with which the cylinder volume Vc is filled under the standard atmospheric condition. The target charging efficiency Ect and the target in-cylinder fresh air amount Qct are values which correlate to each other; based on the calculated value of one of them, the value of the other one is calculated.

<Target Intake Air Flow Rate Calculation Unit 123>

Based on the target in-cylinder fresh air amount Qct, the target intake air flow rate calculation unit 123 calculates the target intake air flow rate (amount) Qat [g/s] to be taken in by the engine 1 through the intake path 2. In the present embodiment, as shown in the equation (13) below, the target intake air flow rate calculation unit 123 obtains a value by applying first-order advance filtering processing, which has a characteristic reverse to that of the foregoing first-order lag filtering processing represented in the equation (2), to the target in-cylinder fresh air amount Qct; then, the target intake air flow rate calculation unit 123 divides the obtained value by the stroke period ΔT so as to calculate the target intake air flow rate Qat. The target intake air flow rate Qat corresponds to the target value of the flow rate of air that passes through the intake path 2 (for example, the throttle valve 4) at the upstream side of the intake manifold 5 (the surge tank). In this example, the stroke period ΔT is set to in the interval of BTDC5degCA; in the case of a four-cylinder engine, the stroke period ΔT is the interval of 180degCA; in the case of a three-cylinder engine, the stroke period ΔT is the interval of 240degCA.

$$Qat(n) = \{1/(1-KCCA) \times Qct(n) - KCCA/(1-KCCA) \times Qct(n-1)\}/\Delta T(n) \quad (13)$$

<Throttle Opening Degree Control Unit 124>

The throttle opening degree control unit 124 controls the throttle opening degree, based on the target intake air flow rate Qat. Based on the target intake air flow rate Qat, the throttle opening degree control unit 124 sets a target throttle opening degree THt and then applies driving control to the throttle motor 40 so that the actual throttle opening degree THr approaches a target throttle opening degree THt.

In the present embodiment, the throttle opening degree control unit 124 calculates the target throttle opening degree THt for realizing the target intake air flow rate Qat, by use of a fluid-mechanics theoretical formula, i.e., an orifice flow rate calculation equation for a compressible fluid, in which the flow in the vicinity of the throttle valve 4 is regarded as flows before and after a throttle valve.

The theoretical formula for the intake air flow rate Qa[g/s] which flows through the throttle valve 4, regarded as a throttle valve, is derived as shown in the equation (14) below, from the energy conservation law, the isentropic flow relational equation, the sonic velocity relational equation, and the state equation.

$$\frac{1}{2}Ue^2 + \frac{\kappa}{\kappa-1}\frac{Pe}{\rho e} = \frac{\kappa}{\kappa-1}\frac{P2}{\rho 2}, \quad (14)$$

$$\frac{P}{\rho^\kappa} = Const.,$$

$$a = \sqrt{\kappa \cdot R \cdot T},$$

$$\rho = \frac{P}{R \cdot T}$$

$$\therefore Qa = \rho 2 \cdot a2 \cdot Sth \cdot \sigma 2$$

$$\because \sigma 2 = \sqrt{\frac{2}{\kappa-1}\left[\left(\frac{Pd}{P2}\right)^{\frac{2}{\kappa}} - \left(\frac{Pb}{P2}\right)^{\frac{\kappa+1}{\kappa}}\right]}$$

Where κ is a specific heat ratio; R is a gas constant; ρ is a density; T is a temperature; "a" is a sonic velocity; U is a flow rate; Sth is the effective opening area of the throttle valve 4; Const. is a fixed value. σ2 is a flow rate correction coefficient which changes in accordance with the pressure ratio Pb/P2 of the upstream and downstream (before and after) of the throttle valve 4. The "2" added after character denotes a variable at the upstream side of the throttle valve 4; the "b" added after character denotes a variable at the downstream side of the throttle valve 4 (in the intake manifold 5); the "e" added after character denotes a variable at the throttle valve 4.

The throttle opening degree control unit 124 calculates the flow rate correction coefficient σ2 corresponding to an actual before/after-throttle pressure ratio Pbr/P2r, which is the pressure ratio of the actual manifold pressure Pbr and the actual supercharging pressure P2r, by use of a map data in which the relationship between the flow rate correction coefficient σ2 and the before/after-throttle pressure ratio Pb/P2, which is the ratio of the manifold pressure Pb and the supercharging pressure P2, is preliminarily set based on the equation for the flow rate correction coefficient σ2 in the equation (14) above. The throttle opening degree control unit 124 calculates a sonic velocity a2 corresponding to the actual intake air temperature T1r, by use a map data in which the relationship between the temperature T and the sonic velocity a is preliminarily set based on the equation for the sonic velocity a in the equation (14) above. By use of the equation for the density ρ in the equation (14) above, the throttle opening degree control unit 124 calculates the density ρ2, based on the actual supercharging pressure P2r and the actual intake air temperature T1r. As shown in the equation (15) below, the throttle opening degree control unit 124 divides the target intake air flow rate Qat by the flow rate correction coefficient σ2, the sonic velocity a2, and the density ρ2 so as to calculate a target throttle effective opening area Stht.

$$Stht = Qat/(\sigma 2 \times a2 \times \rho 2) \quad (15)$$

The throttle opening degree control unit 124 calculates, as the target throttle opening degree THt, a throttle opening degree corresponding to the target throttle effective opening area Stht, by use of a map data in which the relationship between the effective opening area Sth and the throttle opening degree is preliminarily set. Then, the throttle opening degree control unit 124 changes the control value for the throttle motor 40 so that the actual throttle opening degree THr approaches the target throttle opening degree THt.

The throttle opening degree control unit 124 calculates a learning value for correcting the target throttle effective opening area Stht so that the actual intake air flow rate Qar approaches the target intake air flow rate Qat. As a result, the target intake air flow rate Qat can accurately be achieved.

By controlling the intake air flow rate Qa in such a manner as described above, a torque demanded value from the driver or another controller can accurately be achieved.

2-3. Wastegate Valve Control Unit 112

The wastegate valve control unit 112 performs a driving control of the wastegate valve 34 so as to control the supercharging pressure P2. As shown in FIG. 2, the wastegate valve control unit 112 includes a target supercharging pressure calculation unit 131, a target total compressor driving force calculation unit 132, a target turbine flow rate calculation unit 133, an exhaust gas flow rate calculation unit 134, a target gate flow rate calculation unit 135, a target before/after-turbine pressure ratio calculation unit 136, a target turbine upstream pressure calculation unit 137, a target gate effective opening area calculation unit 138, a gate valve control value calculation unit 139, and an actual turbo compressor driving force calculation unit 140. Hereinafter, the respective configurations of the control units of the wastegate valve control unit 112 will be explained in detail.

<Target Supercharging Pressure Calculation Unit 131>

Based on the target charging efficiency Ect and the actual rotation speed Ner, the target supercharging pressure calculation unit 131 calculates a target supercharging pressure P2$t$, which is the target value of the supercharging pressure P2 which is the pressure at a position, in the intake path 2, which is at the downstream side of the turbo compressor 31 and at the upstream side of the throttle valve 4. In the present embodiment, based on the actual rotation speed Ner and the actual manifold pressure Pbr, the target supercharging pressure calculation unit 131 calculates the volumetric efficiency Kv on the basis of the intake manifold 5; based on the volumetric efficiency Kv, the target charging efficiency Ect, and the actual intake air temperature T1$r$, the target supercharging pressure calculation unit 131 calculates a target manifold pressure Pbt, which is a target value of the pressure in the intake manifold 5; then, the target supercharging pressure calculation unit 131 adds a pressure addition value KP2 to the target manifold pressure Pbt so as to calculate the target supercharging pressure P2$t$. The volumetric efficiency Kv is a volumetric efficiency Kv on the basis of the volume of air in the intake manifold 5, i.e., the ratio of the volume of air, in the intake manifold 5, which is taken in by the cylinder 8, to the cylinder volume Vc (Kv=the volume of air, in the intake manifold 5, taken in by the cylinder 8/Vc). As is the case with the actual in-cylinder fresh air amount calculation unit 142, the target supercharging pressure calculation unit 131 calculates the volumetric efficiency Kv corresponding to the actual rotation speed Ner and the actual manifold pressure Pbr, by use of a map data in which the relationship among the rotation speed Ne, the manifold pressure Pb, and the volumetric efficiency Kv is preliminarily set. In the present embodiment, the volumetric efficiency Kv calculated by the actual in-cylinder fresh air amount calculation unit 142 is utilized.

As shown in the equation (16) below, based on the target charging efficiency Ect on the basis of the atmospheric air, the volumetric efficiency Kv on the basis of the intake manifold 5, and the actual intake air temperature T1$r$ as an environmental correction, the target supercharging pressure calculation unit 131 calculates the target manifold pressure Pbt. Where P10 denotes the atmospheric pressure P1 under the standard atmospheric condition (in this example, P10=1 atm); T10 denotes the intake air temperature T1 under the standard atmospheric condition (in this example, T10=25° C.).

$$Pbt = P10 \cdot \frac{Ect}{Kv} \cdot \frac{T1}{T10} \tag{16}$$

As shown in the equation (17) below, the target supercharging pressure calculation unit 131 calculates the pressure addition value KP2 corresponding to the target charging efficiency Ect and the actual rotation speed Ner, by use of a map data MAP1 in which the relationship among the target charging efficiency Ect, the rotation speed Ne, and the pressure addition value KP2 is preliminarily set. Then, the target supercharging pressure calculation unit 131 adds the pressure addition value KP2 to the target manifold pressure Pbt so as to calculate the target supercharging pressure P2$t$. The pressure addition value KP2 is a value for securing the pressure difference between the pressure before the throttle valve 4 and the pressure after the throttle valve 4 and controlling the intake air flow rate Qa by the throttle valve 4. It may be allowed that the pressure addition value KP2 is set to a fixed value of approximately 5 [kPa].

$$P2t = Pbt + KP2$$

$$KP2 = MAP1(Ect, Ner) \tag{17}$$

In such a way as described above, the target supercharging pressure P2$t$ necessary for achieving the target charging efficiency Ect can accurately be calculated.

<Target Total Compressor Driving Force Calculation Unit 132>

Based on the target intake air flow rate Qat, and a target total before/after-compressor pressure ratio P2$t$/P1$r$ which is a pressure ratio of the target supercharging pressure P2$t$ and the actual atmospheric pressure P1$r$, the target total compressor driving force calculation unit 132 calculates a target total compressor driving force Pct, which is a target value of a total compressor driving force summing a driving force of the turbo compressor 31 and a driving force of the electric compressor 42.

At first, the basic characteristics of the turbo compressor 31 and the turbine 32 will be explained. Taking the mass conservation law, the polytropic change, and the adiabatic efficiency, which are physical laws regarding the state of air, into consideration, the turbine output Pt[W] and the driving force Pc[W] of the turbo compressor 31 are calculated through the theoretical equation (18) below.

$$Pt = Qt \cdot \eta t \cdot Wt = Qt \cdot \eta t \cdot Cp \cdot T3 \cdot \left(1 - \left(\frac{P4}{P3}\right)^{\frac{\kappa-1}{\kappa}}\right) = \tag{18}$$

$$Qt \cdot \eta t \frac{\kappa}{\kappa-1} R \cdot T3 \cdot \left(1 - \left(\frac{P4}{P3}\right)^{\frac{\kappa-1}{\kappa}}\right)$$

$$Pc = \frac{Qcmp \cdot Wc}{\eta c} = Qcmp \frac{1}{\eta c} Cp \cdot T12 \cdot \left(\left(\frac{P2}{P12}\right)^{\frac{\kappa-1}{\kappa}} - 1\right) =$$

$$Qcmp \frac{1}{\eta c} \frac{\kappa}{\kappa-1} R \cdot T12 \cdot \left(\left(\frac{P2}{P12}\right)^{\frac{\kappa-1}{\kappa}} - 1\right)$$

$$\because Cp = \frac{\kappa}{\kappa-1} R$$

Where Cp is a constant-pressure specific heat[kJ/(kg·K)]; Wt is a turbine output [J] per unit flow rate; Wc is a compressor work [J] per unit flow rate; κ is a specific heat ratio; Qt is the mass flow rate[g/s] of exhaust gas that passes through the turbine 32; Qcmp is the mass flow rate[g/s] of air which passes through the turbo compressor 31; R is a gas constant[kJ/(kg·K)], $\eta t$ is the adiabatic efficiency of the turbine 32; $\eta c$ is the adiabatic efficiency of the turbo compressor 31; T3 is the temperature of exhaust gas; P3 is the pressure at the upstream side of the turbine 32; P4 is the pressure at the downstream side of the turbine 32.

Because in the normal state, the turbo compressor bypass valve 33 is basically closed and hence all the intake air (the intake air flow rate Qa) passes through the turbo compressor 31, it can be assumed, in the equation (18) above, that the intake air flow rate Qa is equal to the turbo compressor-passing flow rate Qcmp. The target total compressor driving force Pct is a total compressor driving force in the entire intake path 2 summing the turbo compressor 31 and the electric compressor 42. Accordingly, as shown in the equation (19) below, the target total compressor driving force calculation unit 132 calculates the target total compressor driving force Pct, based on the target total before/after-compressor pressure ratio P2t/P1r which is a pressure ratio of the target supercharging pressure P2t and the actual atmospheric pressure P1r, the target intake air flow rate Qat, the target adiabatic efficiency $\eta$ct, and the actual intake air temperature T1r. Instead of the index calculation of the target total before/after-compressor pressure ratio P2t/P1r in the equation (19), a map data in which the relationship between the pressure ratio and the index calculation result of the pressure ratio is preliminarily set may be used.

$$Pct = Qat \frac{1}{\eta ct} \frac{\kappa}{\kappa-1} R \cdot T1r \cdot \left( \left( \frac{P2t}{P1r} \right)^{\frac{\kappa-1}{\kappa}} - 1 \right) \quad (19)$$

As shown in the equation (20) below, the target total compressor driving force calculation unit 132 calculates the target adiabatic efficiency $\eta$ct corresponding to the target intake air flow rate Qat and the target total before/after-compressor pressure ratio P2t/P1r, by use of a map data MAP2 in which the relationship among the intake air flow rate Qa, the before/after-turbo compressor pressure ratio P2/P12, and the adiabatic efficiency $\eta c$ of the turbo compressor 31 is preliminarily set. It may be allowed that the target total compressor driving force calculation unit 132 calculates the target total compressor driving force Pct without considering the change in the adiabatic efficiency, for example, by setting the target adiabatic efficiency $\eta$ct to a fixed value.

$$\eta ct = MAP2(Qat, P2t/P1r) \quad (20)$$

<Real Turbo Compressor Driving Force Calculation Unit 140>

The actual turbo compressor driving force calculation unit 140 calculates an actual turbo compressor driving force Pcr which is an actual driving force for the turbo compressor 31, based on the actual intake air flow rate Qar, and the actual before/after-turbo compressor pressure ratio P2r/P12r which is a pressure ratio of the actual supercharging pressure P2r and the actual intermediate supercharging pressure P12r.

As shown in the equation (21), the actual turbo compressor driving force calculation unit 140 calculates the actual turbo compressor driving force Pcr, based on the actual intake air flow rate Qar, the actual before/after-turbo compressor pressure ratio P2r/P12r, the actual adiabatic efficiency $\eta$cr of the turbo compressor 31, and the actual intermediate supercharge temperature T12r. Instead of the index calculation of the actual before/after-turbo compressor pressure ratio P2r/P12r in the equation (21), a map data in which the relationship between the pressure ratio and the index calculation result of the pressure ratio is preliminarily set may be used.

$$Pcr = Qar \frac{1}{\eta cr} \frac{\kappa}{\kappa-1} R \cdot T12r \cdot \left( \left( \frac{P2r}{P12r} \right)^{\frac{\kappa-1}{\kappa}} - 1 \right) \quad (21)$$

As shown in the equation (22) below, the actual turbo compressor driving force calculation unit 140 calculates the actual adiabatic efficiency $\eta$cr corresponding to the actual intake air flow rate Qar and the actual before/after-turbo compressor pressure ratio P2r/P12r, by use of the same map data MAP2 as the equation (20).

$$\eta cr = MAP2(Qar, P2r/P12r) \quad (22)$$

<Target Turbine Flow Rate Calculation Unit 133>

The target turbine flow rate calculation unit 133 calculates a target turbine flow rate Qtt, which is a target value of the turbine flow rate Qt, for realizing the target total compressor driving force Pct. In the present embodiment, as shown in the equation (23) below, the target turbine flow rate calculation unit 133 calculates, as the target turbine flow rate Qtt, the turbine flow rate Qt corresponding to the target total compressor driving force Pct, by use of a map data MAP3 in which the relationship between the turbine output Pt which becomes a driving force for the turbo compressor 31, and the turbine flow rate Qt is preliminarily set.

$$Qtt = MAP3(Pct) \quad (23)$$

In the equation (18), which is a theoretical formula for calculating the turbine output Pt, the turbine flow rate Qt and the before/after-turbine pressure ratios P3/P4 are used; however, since there exists a strong correlation between the turbine flow rate Qt and the before/after-turbine pressure ratios P3/P4, the before/after-turbine pressure ratios P3/P4 can be omitted, and the relationship of the equation (23) can be derived.

<Exhaust Gas Flow Rate Calculation Unit 134>

The exhaust gas flow rate calculation unit 134 calculates an actual exhaust gas flow rate Qexr which is an actual value of the exhaust gas flow rate Qex, based on the actual intake air flow rate Qar and the air-fuel ratio AF. In the present embodiment, as shown in the equation (24) below, the exhaust gas flow rate calculation unit 134 calculates the actual exhaust gas flow rate Qexr, based on the actual in-cylinder fresh air amount Qcr calculated based on the actual intake air flow rate Qar, and the exhaust gas air-fuel ratio AF detected by the air-fuel ratio sensor 16. Instead of Qcr/ΔT, the actual intake air flow rate Qar may be utilized; as the air-fuel ratio AF, the target value of the air-fuel ratio AF, which is utilized in the fuel calculation, may be utilized.

$$Qexr = \frac{Qcr}{\Delta T}\left(1 + \frac{1}{AF}\right) \quad (24)$$

<Target Gate Flow Rate Calculation Unit 135>

The target gate flow rate calculation unit 135 calculates a target wastegate flow rate Qwgt, based on the actual exhaust gas flow rate Qexr and the target turbine flow rate Qtt. In the present embodiment, as shown in the equation (25) below, the target gate flow rate calculation unit 135 subtracts the target turbine flow rate Qtt from the actual exhaust gas flow rate Qexr so as to calculate the target wastegate flow rate Qwgt.

$$Qwgt = Qexr - Qtt \quad (25)$$

<Target Before/After-Turbine Pressure Ratio Calculation Unit 136>

The target before/after-turbine pressure ratio calculation unit 136 calculates a target before/after-turbine pressure ratio P3t/P4t for realizing the target total compressor driving force Pct. The target before/after-turbine pressure ratio P3t/P4t is a target value of the before/after-turbine pressure ratio which is a pressure ratio of the upstream and downstream of the turbine 32. In the present embodiment, as shown in the equation (26) below, the target before/after-turbine pressure ratio calculation unit 136 calculates, as the target before/after-turbine pressure ratio P3t/P4t, the before/after-turbine pressure ratios P3/P4 corresponding to the target total compressor driving force Pct, by use of a map date MAP4 in which the relationship between the turbine output Pt which becomes a driving force for the turbo compressor 31, and the before/after-turbine pressure ratios P3/P4 is preliminarily set.

$$P3t/P4t = MAP4(Pct) \quad (26)$$

As described above, in the equation (18), which is a theoretical formula for calculating the turbine output Pt, the turbine flow rate Qt and the before/after-turbine pressure ratios P3/P4 are used; however, since there exists a strong correlation between the turbine flow rate Qt and the before/after-turbine pressure ratios P3/P4, the turbine flow rate Qt can be omitted, and the relationship of the equation (26) can be derived.

<Target Turbine Upstream Pressure Calculation Unit 137>

The target turbine upstream pressure calculation unit 137 calculates an actual turbine downstream pressure P4r which is an actual value of the turbine downstream pressure P4, based on the actual exhaust gas flow rate Qexr; and calculates a target turbine upstream pressure P3t which is a target value of the turbine upstream pressure P3, based on the actual turbine downstream pressure P4r and the target before/after-turbine pressure ratio P3t/P4t.

In the present embodiment, as shown in the equation (27) below, the target turbine upstream pressure calculation unit 137 calculates the atmospheric pressure ratios P4/P1 corresponding to the actual exhaust gas flow rate Qexr, by use of a map data MAP5 in which the relationship between the exhaust gas flow rate Qex and the atmospheric pressure pressure ratio P4/P1 which is a pressure ratios of the turbine downstream pressure P4 and the atmospheric pressure P1 is preliminarily set, $$P4/P1 = MAP5(Qexr) \quad (27)$$

As shown in the equation (28) below, the target turbine upstream pressure calculation unit 137 calculates the actual turbine downstream pressure P4r by multiplying the atmospheric pressure pressure ratio P4/P1 by the actual atmospheric pressure P1r. Then, as shown in the equation (29) below, the target turbine upstream pressure calculation unit 137 calculates the target turbine upstream pressure P3t by multiplying the target before/after-turbine pressure ratio P3t/P4t by the actual turbine downstream pressure P4r.

$$P4 = (P4/P1) \times P1r \quad (28)$$

$$P3t = (P3t/P4t) \times P4 \quad (29)$$

<Target Gate Effective Opening Area Calculation Unit 138>

The target gate effective opening area calculation unit 138 calculates a target gate effective opening area Swgt, which is a target value of an effective opening area of the wastegate valve 34, based on the target wastegate flow rate Qwgt, the target before/after-turbine pressure ratio P3t/P4t, and the target turbine upstream pressure P3t.

In the present embodiment, the target gate effective opening area calculation unit 138 calculates the target gate effective opening area Swgt for realizing the target wastegate flow rate Qwgt, by use of a fluid-mechanics theoretical formula, i.e., an orifice flow rate calculation equation for a compressible fluid, in which as is the case with the above-mentioned throttle valve 4, the flow in the vicinity of the wastegate valve 34 is regarded as flows before and after a throttle valve.

As is the case with the equation (14) above, the theoretical formula for the wastegate flow rate Qwg [g/s] which flows through the wastegate valve 34, which is regarded as a throttle valve, is derived as represented in the equation (30) below, from the energy conservation law, the isoentropic flow relational equation, the sonic velocity relational equation, and the state equation.

$$Qwg = \rho 3 \cdot a3 \cdot Swg \cdot \sigma 3 \quad (30)$$

$$\because a3 = \sqrt{\kappa \cdot R \cdot T3},$$

$$\sigma 3 = \sqrt{\frac{2}{\kappa - 1}\left[\left(\frac{P4}{P3}\right)^{\frac{2}{\kappa}} - \left(\frac{P4}{P3}\right)^{\frac{\kappa+1}{\kappa}}\right]},$$

$$\rho 3 = \frac{P3}{R \cdot T3}$$

Where ρ3 is an exhaust gas density at the upstream side of the wastegate valve 34; T3 is an exhaust gas temperature at the upstream side of the wastegate valve 34; a3 is an exhaust gas sonic velocity at the upstream side of the wastegate valve 34; Swg is an effective opening area of the wastegate valve 34. σ3 is a flow rate correction coefficient which changes in accordance with the pressure ratio P4/P3 of the upstream and downstream (before and after) of the wastegate valve 34.

The target gate effective opening area calculation unit 138 calculates the flow rate correction coefficient σ3 corresponding to the target before/after-turbine pressure ratio P3t/P4t, by use of a map data in which the relationship between the before/after-turbine pressure ratio P3/P4 and the flow rate correction coefficient σ3 is preliminarily set, based on the theoretical equation for the flow rate correction coefficient σ3 in the equation (30) above.

The target gate effective opening area calculation unit 138 calculates the actual exhaust gas temperature T3r corresponding to the actual rotation speed Ner and the actual charging efficiency Ecr calculated based on the actual intake air flow rate Qar, by use of an map data in which the relationship among the charging efficiency Ec, the rotation speed Ne, and the exhaust gas temperature T3 is preliminarily set.

The target gate effective opening area calculation unit 138 calculates the sonic velocity a3 corresponding to the actual exhaust-gas temperature T3r, by use of a map data in which the relationship between the temperature T3 and the sonic velocity a3 is preliminarily set based on the theoretical formula for the sonic velocity a3 in the equation (30) above.

As shown in the equation (31) below, the target gate effective opening area calculation unit 138 utilizes the theoretical formula for the density ρ3 in the equation (30) above so as to calculate the density ρ3, based on the target turbine upstream pressure P3t and the actual exhaust gas temperature T3r.

$$\rho 3 = P3t/(R \times T3r) \tag{31}$$

Then, as shown in the equation (32) below, the target gate effective opening area calculation unit 138 divides the target wastegate flow rate Qwgt by the flow rate correction coefficient σ3, the sonic velocity a3, and the density ρ3 so as to calculate the target gate effective opening area Swgt.

$$Swgt = Qwgt/(\sigma 3 \times a3 \times \rho 3) \tag{32}$$

<Gate Valve Control Value Calculation Unit 139>

Based on the target gate effective opening area Swgt, the gate valve control value calculation unit 139 calculates a gate valve control value WG, which is a control value WG for the gate valve actuator 34a. Based on the gate valve control value WG, the controller 100 outputs a control signal to the gate valve actuator 34a so as to perform driving control of the wastegate valve 34.

In the present embodiment, the gate valve control value calculation unit 139 calculates the gate valve control value WG corresponding to the target gate effective opening area Swgt, by use of an map data in which the relationship between the effective opening area Swg of the wastegate valve 34 and the gate valve control value WG is preliminarily set.

The gate valve control value calculation unit 139 performs a driving force feedback control for changing a feedback correction value WGfb, which corrects the gate valve control value WG, so that the actual turbo compressor driving force Pcr calculated by the actual turbo compressor driving force calculation unit 140 approaches the target total compressor driving force Pct. The gate valve control value calculation unit 139 sets, as the final gate valve control value WG, a value obtained by correcting the gate valve control value WG with the feedback correction value WGfb.

Moreover, the gate valve control value calculation unit 139 performs a driving force feedback learning control so as to change a feedback learning value WGlrn for correcting the gate valve control value WG in accordance with a deviation amount of the feedback correction value WGfb from zero. Then, as shown in the equation (33) below, the gate valve control value calculation unit 139 sets, as the final gate valve control value WG, a value obtained by correcting the gate valve control value WG with the feedback correction value WGfb and the feedback learning value WGlrn. Here, the gate valve control value WG calculated based on the target gate effective opening area Swgt is set as a basic gate valve control value WGb.

$$WG = WGb + WGfb + WGlrn \tag{33}$$

2-4. Electric Compressor Control Unit 113

The electric compressor control unit 113 performs a drive control of the compressor driving motor 43 and the electric compressor valve actuator 47 so as to control the intermediate supercharging pressure P12. As shown in FIG. 2, the electric compressor control unit 113 is provided with an electric compressor rotational speed control unit 151 and a bypass valve opening degree control unit 158. Hereinafter, the respective configurations of the electric compressor control unit 113 will be explained in detail.

2-4-1. Electric Compressor Rotational Speed Control Unit 151

In the case where the acceleration demand occurs by the driver and like, the target supercharging pressure P2t rises quickly; however, in the turbocharger 36 utilizing exhaust gas energy, a response delay occurs until the supercharging pressure rises. It is desired to assist a rise of the supercharging pressure part which the response delay occurred, and improve acceleration responsiveness, by operating the electric compressor 42 driven by the electric motor 43 having a quick response.

<Basic Target Rotational Speed Calculation Unit 152>

The electric compressor rotational speed control unit 151 is provided with a basic target rotational speed calculation unit 152. As shown in the equation (34) below, the basic target rotational speed calculation unit 152 calculates a value obtained by subtracting, from the target supercharging pressure P2t, a pressure difference obtained by subtracting the actual intermediate supercharging pressure P12r from the actual supercharging pressure P2r, as a target intermediate supercharging pressure P12t which is a target value of the intermediate supercharging pressure; and calculates a target before/after-electric compressor pressure ratio P12t/P1r which is a ratio of the target intermediate supercharging pressure P12t and the actual atmospheric pressure P1r. The basic target rotational speed calculation unit 152 calculates a target rotational speed of the electric compressor 42, based on the target before/after-electric compressor pressure ratio P12t/P1r and the actual intake air flow rate Qar.

$$P12t = P2t - (P2r - P12r) \tag{34}$$

According to this configuration, by the pressure difference obtained by subtracting the actual intermediate supercharging pressure P12r from the actual supercharging pressure P2r, the actual pressure difference actually supercharged by the turbo compressor is calculated. Then, by subtracting the actual pressure difference of the turbo compressor 31 from the target supercharging pressure P2t at the downstream side of the turbo compressor 31, the target value of the intermediate supercharging pressure which the electric compressor 42 needs to supercharge for realizing the target supercharging pressure P2t is calculated; and based on the target value of the intermediate supercharging pressure, the target value of the before/after-electric compressor pressure ratio which needs to be achieved by the electric compressor 42 can be calculated. Then, under the condition of the actual intake air flow rate Qar which passes the electric compressor 42, the target rotational speed of the electric compressor 42 for realizing the target before/after-electric compressor pressure ratio P12t/P1r is calculated; and by the electric motor 43 having a quick response, the electric compressor 42 can be controlled to the target rotational speed. Therefore, corresponding to the actual insufficient part of the supercharging pressure of the turbo compressor 31 which occurred by the response delay of the turbocharger 36 after the acceleration demand, the rotational speed of the electric compressor 42 can be raised appropriately; the insufficient part of supercharging pressure can be assisted by the electric compressor 42 with a good responsiveness; and the acceleration responsiveness can be improved.

In the present embodiment, a value obtained by dividing the target intermediate supercharging pressure P12t by the actual atmospheric pressure P1r is set as the target before/after-electric compressor pressure ratio P12t/P1r. The target rotational speed of the electric compressor 42 calculated by the basic target rotational speed calculation unit 152 is set to a basic target rotational speed Necpb of the electric compressor 42.

Figure 4:
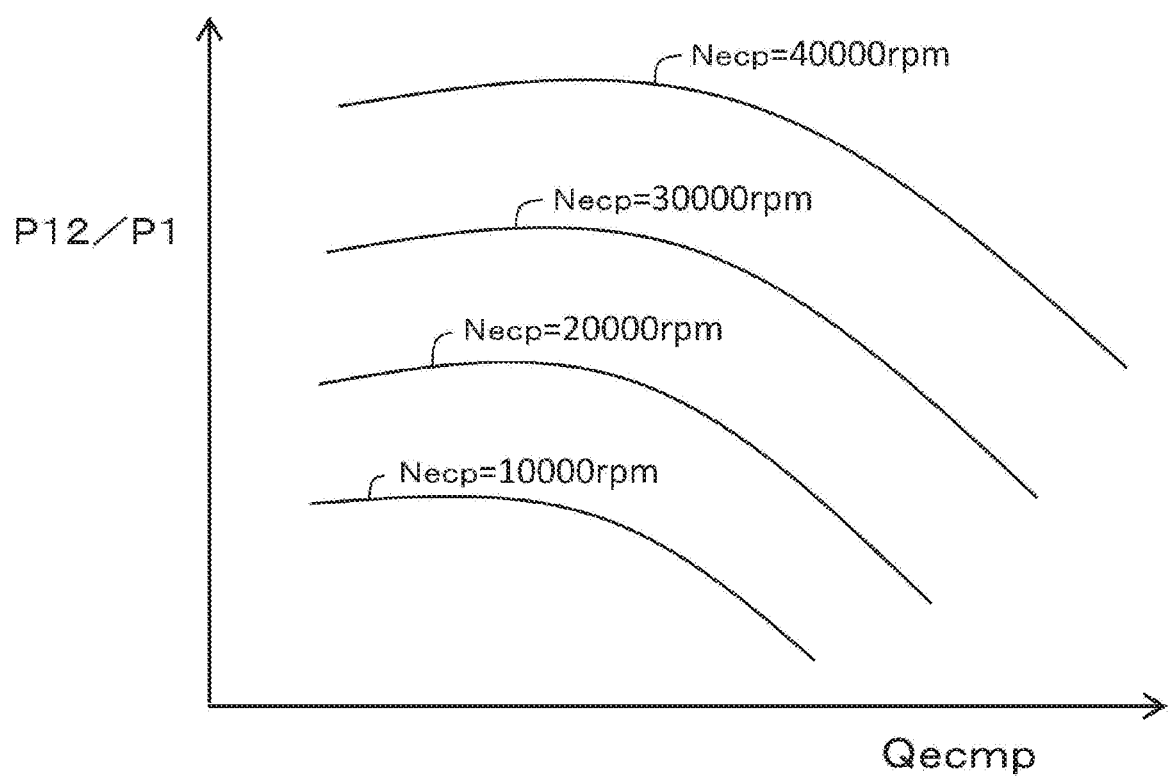
FIG. 4 is a figure for explaining a rotational speed characteristic according to Embodiment 1 of the present invention.

In the present embodiment, the basic target rotational speed calculation unit 152 calculates, as the basic target rotational speed Necpb of the electric compressor, the rotational speed Necp of the electric compressor corresponding to the target before/after-electric compressor pressure ratio P12t/P1r and the actual intake air flow rate Qar, by use of a rotational speed characteristic, as shown in FIG. 4, in which the relationship among the before/after-electric compressor pressure ratio P12/P1 which is a pressure ratio of the upstream and downstream of the electric compressor 42, the passing air flow rate Qecmp of the electric compressor 42, and the rotational speed Necp of the electric compressor 42 is a preliminarily set. FIG. 4 represents equal rotational speed lines obtained by connecting points at which the respective rotational speed Necp of the electric compressor 42 become equal to one another when the before/after-electric compressor pressure ratios P12/P1 and the passing air flow rate Qecmp of the electric compressor 42 are changed. This rotational speed characteristic is stored, as map data, in the storage apparatus 91 such as ROM.

According to this configuration, by use of the rotational speed characteristic of the electric compressor 42, the target rotational speed of the electric compressor can accurately be calculated. Even in the case where specification and characteristic of the electric compressor mounted on the engine 1 is changed, since the rotational speed characteristic which can be measured using the electric compressor solely is used, it is not necessary to perform data measurement and matching in the state where the internal combustion engine and the electric compressor were combined, and the man hour of data measurement and matching can be reduced.

In the case where supercharging is performed by the electric compressor 42, since the electric compressor bypass valve 45 is closed basically, the actual intake air flow rate Qar can be regarded as the actual passing air flow rate Qecmpr of the electric compressor 42. However, in the present embodiment, as described later, there are cases where the electric compressor bypass valve 45 is opened. Accordingly, the basic target rotational speed calculation unit 152 uses, as the actual intake air flow rate Qar, the actual passing air flow rate Qecmpr of the electric compressor 42 calculated by the actual electric compressor flow rate calculation unit 157 described below; and calculates the target rotational speed of the electric compressor 42, based on the target before/after-electric compressor pressure ratio P12t/P1r and the actual passing air flow rate Qecmpr of the electric compressor 42. According to this configuration, regardless of the opening/closing state of the electric compressor bypass valve 45, a target rotational speed can accurately be calculated.

<Control of Compressor Driving Force>

In the present embodiment, also in the viewpoint of the driving force of the compressor, by assisting the turbo compressor 31 by the electric compressor 42, it is configured to improve the control accuracy of the supercharging pressure. For that, the electric compressor rotational speed control unit 151 is provided with a target electric compressor driving force calculation unit 153, an actual electric compressor driving force calculation unit 154, and a target rotational speed correction unit 155. The details will be explained below.

As shown in the equation (35) below, the target electric compressor driving force calculation unit 153 calculates, as a target electric compressor driving force Pecpt which is a target value of the driving force of the electric compressor, a value obtained by subtracting the actual turbo compressor driving force Pcr calculated by the actual turbo compressor driving force calculation unit 140 from the target total compressor driving force Pct calculated by the target total compressor driving force calculation unit 132.

$$Pecpt = Pct - Pcr \quad (35)$$

According to this configuration, by subtracting the actual turbo compressor driving force Pcr from the target value of the total compressor driving force in the entire intake path 2 summing the turbo compressor 31 and the electric compressor 42, which is required in order to achieve the target supercharging pressure P2t, the target value of the driving force which the electric compressor 42 needs to assist for achieving the target supercharging pressure P2t can be calculated.

The actual electric compressor driving force calculation unit 154 calculates an actual electric compressor driving force Pecpr which is an actual value of the driving force of the electric compressor 42, based on the actual intake air flow rate Qar, and an actual before/after-electric compressor pressure ratio P12r/P1r which is a pressure ratio of the actual atmospheric pressure P1r and the actual intermediate supercharging pressure P12r.

In the present embodiment, as shown in the equation (36) below, the actual electric compressor driving force calculation unit 154 calculates the actual electric compressor driving force Pecpr, based on the actual intake air flow rate Qar, the actual before/after-electric compressor pressure ratio P12r/P1r, the actual adiabatic-efficiency ηecr of the electric compressor 42, and the actual intake air temperature T1r at the upstream side of the electric compressor 42. Instead of the index calculation of the actual before/after-electric compressor pressure ratio P12r/P1r in the equation (36), a map data in which the relationship between the pressure ratio and the index calculation result of the pressure ratio is preliminarily set may be used.

$$Pecpr = Qar \frac{1}{\eta ecr} \frac{\kappa}{\kappa-1} R \cdot T1r \cdot \left( \left( \frac{P12r}{P1r} \right)^{\frac{\kappa-1}{\kappa}} - 1 \right) \quad (36)$$

As shown in the equation (37) below, the actual electric compressor driving force calculation unit 154 calculates the actual adiabatic efficiency ηecr corresponding to the actual intake air flow rate Qar and the actual before/after-electric compressor pressure ratio P12r/P1r, by use of a map data MAP6 in which the relationship among the intake air flow rate Qa, the before/after-electric compressor pressure ratios P12/P1, and the adiabatic efficiency ηec of the electric compressor 42 is preliminarily set. It may be allowed that the actual electric compressor driving force calculation unit 154 calculates the actual electric compressor driving force Pecpr without considering the change in the adiabatic efficiency ηec, for example, by setting the actual adiabatic efficiency ηecr to a fixed value.

$$\eta ecr = MAP6(Qar, P12r/P1r) \quad (37)$$

In the case where supercharging is performed by the electric compressor 42, since the electric compressor bypass valve 45 is closed basically, in the equation (36) and the equation (37), the actual intake air flow rate Qar is regarded as the actual passing air flow rate Qecmpr of the electric compressor 42. However, in the present embodiment, as described later, there are cases where the electric compressor bypass valve 45 is opened. Accordingly, the actual electric compressor driving force calculation unit 154 uses the actual passing air flow rate Qecmpr of the electric compressor 42 as the actual intake air flow rate Qar of the equation (36) and the equation (37); and calculates the actual electric compressor driving force Pecpr, based on the actual before/after-electric compressor pressure ratio P12r/P1r and the actual passing air flow rate Qecmpr of the electric compressor 42. According to this configuration, regardless of the opening/closing state of the electric compressor bypass valve 45, the actual electric compressor driving force Pecpr can accurately be calculated.

The target rotational speed correction unit 155 calculates a rotational speed correction amount ΔNecpfb which corrects the target rotational speed of the electric compressor, based on the driving force difference between the target electric compressor driving force Pecpt and the actual electric compressor driving force Pecpr. As shown in the equation (38), the target rotational speed correction unit 155 calculates the final target rotational speed Necpt of the electric compressor 42 by adding the rotational speed correction amount ΔNecpfb to the basic target rotational speed Necpb.

$$Necpt = Necpb + \Delta Necpfb \quad (38)$$

In the case where the actual electric compressor driving force Pecpr is lower than the target electric compressor driving force Pecpt, the increase correction of the target rotational speed Necpt is performed; in the case where the actual electric compressor driving force Pecpr is higher than the target electric compressor driving force Pecpt, the decrease correction of the target rotational speed Necpt is performed. The value of rotational speed correction amount ΔNecpfb to the driving force difference is set to the value which was previously matched using the actual machine. For example, the target rotational speed correction unit 155 calculates the rotational speed correction amount ΔNecpfb by PI control which performs the proportional calculation and the integral calculation to the driving force difference; and the proportional gain and the integral gain are set to the values which are previously matched. Besides PI control, other feedback control, such as P control and PID control, may be used.

According to this configuration, even in the case where the supercharging pressure deviates from the target value due to the individual variation of the electric compressor and the engine, by controlling the driving force of the compressor, it is possible to bring the supercharging pressure close to the target value.

The electric compressor rotational speed control unit 151 controls the compressor driving motor 43 so that the rotational speed of the electric compressor 42 approaches the target rotational speed Necpt of the electric compressor 42. In the present embodiment, as mentioned above, the electric compressor rotational speed control unit 151 transmits the target rotational speed Necpt to the motor controller of the compressor driving motor 43, and the motor controller controls the motor output so that the motor rotational speed approaches the target rotational speed.

<Real Bypass Valve Flow Rate Calculation Unit 156, Real Electric Compressor Flow Rate Calculation Unit 157>

In the present embodiment, in order to calculate the actual passing air flow rate Qecmpr of the electric compressor 42, the electric compressor rotational speed control unit 151 is provided with an actual bypass valve flow rate calculation unit 156 and an actual electric compressor flow rate calculation unit 157. The details will be explained below.

The actual bypass valve flow rate calculation unit 156 calculates an actual bypass valve passing air flow rate Qecbvr which is an actual value of the passing air flow rate of the electric compressor bypass valve 45, based on the actual opening degree BVr of the electric compressor bypass valve 45, and the actual before/after-electric compressor pressure ratio P12r/P1r which is the pressure ratio of the actual atmospheric pressure P1r and the actual intermediate supercharging pressure P12r.

In the present embodiment, the actual bypass valve flow rate calculation unit 156 calculates the actual bypass valve passing air flow rate Qecbvr, by use of the fluid-mechanics theoretical formula, i.e., the orifice flow rate calculation equation for compressible fluid, in which as is the case with the above-mentioned the throttle valve 4 and the wastegate valve 34, the flow in the vicinity of the electric compressor bypass valve 45 is regarded as flows before and after a throttle valve.

Figure 5:
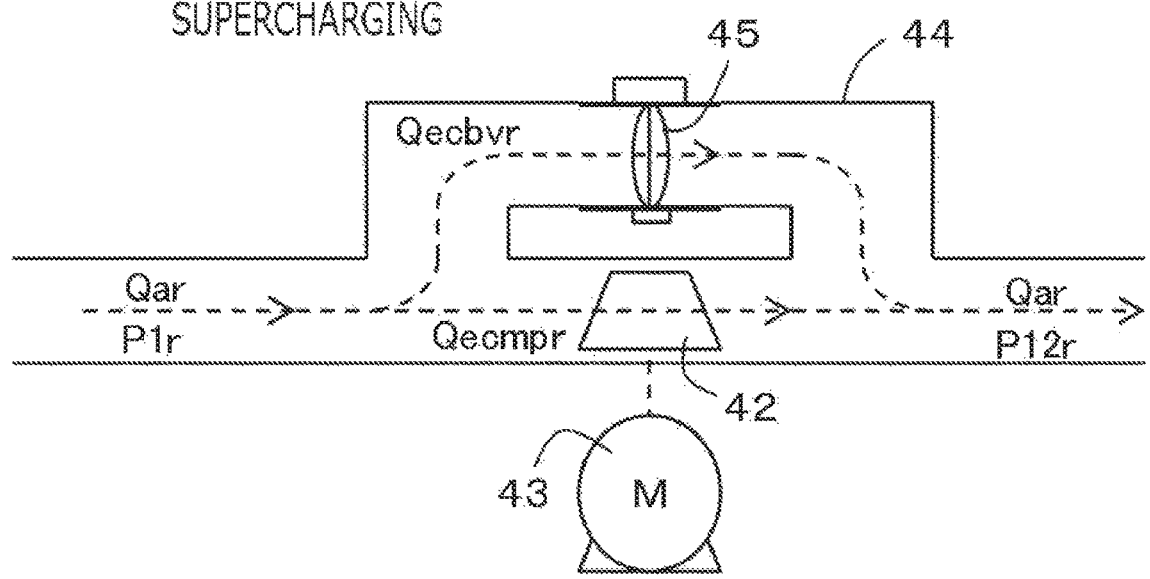
FIG. 5 is a figure for explaining intake air flow in case of not performing supercharging by the electric compressor according to Embodiment 1 of the present invention.
Figure 6:
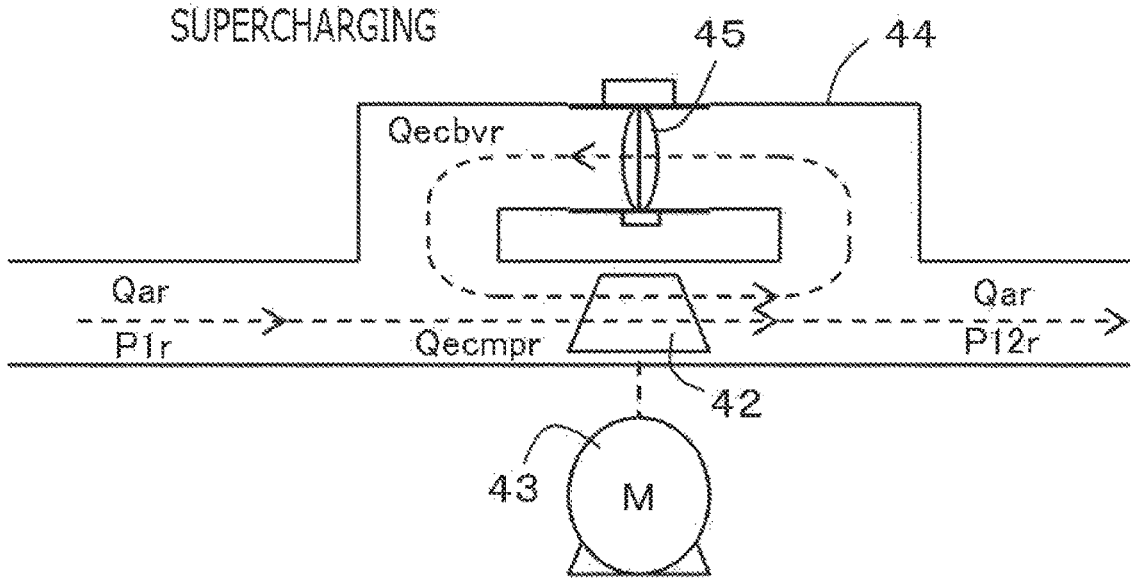
FIG. 6 is a figure for explaining intake air flow in case of performing supercharging by the electric compressor according to Embodiment 1 of the present invention.

However, as shown in FIG. 5 and FIG. 6, according to presence/absence of supercharging by the electric compressor 42, the size relation between the atmospheric pressure P1, which becomes the pressure at the upstream side (the atmospheric air side) of the electric compressor bypass valve 45, and the intermediate supercharging pressure P12, which becomes the pressure at the downstream side (the engine 1 side) is reversed; the flow direction of air which flows through the electric compressor bypass valve 45 is reversed.

In the case of not performing supercharging by the electric compressor 42, as shown in FIG. 5, the actual intermediate supercharging pressure P12r becomes lower than the actual atmospheric pressure P1r by pressure loss (P1r>P12r), and air flows through the electric compressor bypass valve 45 from the upstream side to the downstream side. On the other hand, in the case of performing supercharging by the electric compressor 42, as shown in FIG. 6, the actual intermediate supercharging pressure P12r becomes higher than the actual atmospheric pressure P1r by supercharging (P1r<P12r), and air flows backwards the electric compressor bypass valve 45 from the downstream side to the upstream side.

As is the case with the equation (14) and the equation (30) above, the theoretical formula for the bypass valve passing air flow rate Qecbv [g/s] which flows through the electric compressor bypass valve 45, which is regarded as a throttle valve, is derived as represented in the equation (39) below, from the energy conservation law, the isoentropic flow relational equation, the sonic velocity relational equation, and the state equation. Where, according to the size relation between the atmospheric pressure P1 and the intermediate supercharging pressure P12, the calculation equations of the sonic velocity a4, the flow rate correction coefficient σ4 and the density ρ4 are switched. In the case of P1<P12, since air flows backwards, −1 is multiplied so that the calculated value of the flow rate correction coefficient σ4 becomes negative.

$$Qecbv = \rho 4 \cdot a4 \cdot Secbv \cdot \sigma 4 \quad (39)$$

1) In the case of $P1 > P12$ $$a4 = \sqrt{\kappa \cdot R \cdot T1},$$

$$\sigma 4 = \sqrt{\frac{2}{\kappa - 1}\left[\left(\frac{P12}{P1}\right)^{\frac{2}{\kappa}} - \left(\frac{P12}{P1}\right)^{\frac{\kappa+1}{\kappa}}\right]},$$

$$\rho 4 = \frac{P1}{R \cdot T1}$$

2) In the case of $P1 < P12$ $$a4 = \sqrt{\kappa \cdot R \cdot T12},$$

-continued $$\sigma 4 = \sqrt{\frac{2}{\kappa-1}\left[\left(\frac{P1}{P12}\right)^{\frac{2}{\kappa}} - \left(\frac{P1}{P12}\right)^{\frac{\kappa+1}{\kappa}}\right]},$$

$$\rho 4 = \frac{P12}{R \cdot T12}$$

Where a4 is a sonic velocity of air at the upstream side or the downstream side of the electric compressor bypass valve 45; ρ4 is a density of air at the upstream side or the downstream side of the electric compressor bypass valve 45; σ4 is a flow rate correction coefficient which changes in accordance with the pressure ratio of the upstream and downstream of the electric compressor bypass valve 45; Secbv is an effective opening area of the electric compressor bypass valve 45.

By use of a map data in which the relationship between the pressure ratio and the flow rate correction coefficient σ4 is preliminarily set, based on the theoretical formula of the flow rate correction coefficient σ4 in the above-mentioned equation (39); in the case of P1r>P12r, the actual bypass valve flow rate calculation unit 156 calculates the flow rate correction coefficient σ4 corresponding to the actual bypass valve order pressure ratio P12r/P1r (the actual before/after-electric compressor pressure ratio P12r/P1r); in the case of P1r<P12r, the actual bypass valve flow rate calculation unit 156 calculates the flow rate correction coefficient σ4 corresponding to the actual bypass valve order pressure ratio P1r/P12r (the actual before/after-electric compressor pressure ratio P1r/P12r).

By use of a map data in which the relationship between the temperature and the sonic velocity a4 is preliminarily set, based on the theoretical formula of the sonic velocity a4 in the above-mentioned equation (39); in the case of P1r>P12r, the actual bypass valve flow rate calculation unit 156 calculates the sonic velocity a3 corresponding to the actual intake air temperature T1r; in the case of P1r<P12r, the actual bypass valve flow rate calculation unit 156 calculates the sonic velocity a3 corresponding to the actual intermediate supercharge temperature T12r.

By use of the theoretical formula of the density ρ4 in the above-mentioned equation (39); in the case of P1r>P12r, the actual bypass valve flow rate calculation unit 156 calculates the density ρ4 based on the actual atmospheric pressure P1r and the actual intake air temperature T1r; in the case of P1r<P12r, the actual bypass valve flow rate calculation unit 156 calculates the density ρ4 based on the actual intermediate supercharging pressure P12r and the actual intermediate supercharge temperature T12r.

By use of a map data in which the relationship between the opening degree of the electric compressor bypass valve 45 and the effective opening area of the electric compressor bypass valve 45 is preliminarily set, the actual bypass valve flow rate calculation unit 156 calculates the effective opening area corresponding to the actual opening degree BVr of the electric compressor bypass valve 45, as the actual effective opening area Secbvr of the electric compressor bypass valve 45.

Then, as shown in the equation (40), the actual bypass valve flow rate calculation unit 156 calculates the actual bypass valve passing air flow rate Qecbvr, by multiplying the flow rate correction coefficient σ4, the sonic velocity a4, and the density ρ4, to the actual effective opening area Secbvr of the electric compressor bypass valve 45.

$$Qecbvr = Secbvr \times \sigma 4 \times a4 \times \rho 4 \quad (40)$$

As shown in the equation (41), the actual electric compressor flow rate calculation unit 157 calculates a value obtained by subtracting the actual bypass valve passing air flow rate Qecbvr from the actual intake air flow rate Qar, as the actual passing air flow rate Qecmpr of the electric compressor 42.

$$Qecmpr = Qar - Qecbvr \quad (41)$$

2-4-2. Bypass Valve Opening Degree Control Unit 158

The bypass valve opening degree control unit 158 performs driving control of the electric compressor valve actuator 47, and changes the opening degree of the electric compressor bypass valve 45.

The bypass valve opening degree control unit 158 controls the electric compressor valve actuator 47 basically to close the electric compressor bypass valve 45, in the case of performing supercharging by the electric compressor 42.

However, in the case of not performing supercharging by the electric compressor 42, the electric compressor 42 disturbs the intake air flow, the intake loss occurs, and it leads to deterioration of fuel economy. In particular, during high load operation, there are cases where a larger intake air flow rate than the maximum flow rate which can pass with the flow path geometry of the electric compressor 42 is required of the engine 1. Therefore, in the case of not performing supercharging by the electric compressor 42, as shown in FIG. 5, it is desirable to open the electric compressor bypass valve 45, bypass the electric compressor 42, and flow the intake air to the electric compressor bypass channel 44.

Accordingly, in the case other than the case of performing supercharging by the electric compressor 42, the bypass valve opening degree control unit 158 controls the electric compressor valve actuator 47 to open the electric compressor bypass valve 45. Here, the case other than the case of performing supercharging by the electric compressor 42 includes the case where the response delay of rising of the supercharging pressure by the turbocharger 36 after the acceleration demand was solved, and it becomes unnecessary to assist the turbocharger 36 by the electric compressor 42. That is to say, it includes the case where supercharging by the turbo compressor 31 is performed, but supercharging by the electric compressor 42 is not performed. In such a case, since it is during high load operation, the electric compressor bypass valve 45 is opened, the intake loss can be reduced, and the intake air amount can be increased. Also in the low and middle load in which supercharging by the turbo compressor 31 is not performed, the intake loss can be reduced, and fuel economy can be improved.

As mentioned above, when performing supercharging by the electric compressor 42 after the acceleration demand, the response of supercharging by the electric compressor 42 can be sped up by closing the electric compressor bypass valve 45. However, in the case where the supercharging demand by the electric compressor 42 occurs in the middle and high load, there are cases where the target intake air flow rate Qat becomes larger than the flow rate which can flow through the electric compressor 42. In this case, if the electric compressor bypass valve 45 is set to the fully closed state, there is a possibility that shortage of the intake air flow rate may occur, and output drop of the engine 1 may occur. Therefore, it is necessary to close the opening degree of the electric compressor bypass valve 45 within a range which the output drop of the engine 1 does not occur. This shortage of the intake air flow rate becomes a flow rate difference between the target intake air flow rate Qat and the actual passing air flow rate Qecmpr of the electric compressor 42, this flow rate difference becomes an air flow rate which needs to pass the electric compressor bypass valve 45, and the target effective opening area Secbvt of the electric compressor bypass valve 45 which is necessary for this air flow rate can be calculated by the equation (42).

$$Secbvt = (Qat - Qecmpr)/(\sigma 4 \times a4 \times \rho 4) \quad (42)$$

Accordingly, in the present embodiment, as shown in the equation (42), the bypass valve opening degree control unit 158 calculates the target effective opening area Secbvt of the electric compressor bypass valve 45, by dividing a flow rate difference subtracting the actual passing air flow rate Qecmpr of the electric compressor 42 from the target intake air flow rate Qat, by the flow rate correction coefficient σ4, the sonic velocity a4, and the density ρ4, which are calculated by processing mentioned above. Then, by use of a map data in which the relationship between the opening degree of the electric compressor bypass valve 45 and the effective opening area of the electric compressor bypass valve 45 is preliminarily set, the bypass valve opening degree control unit 158 calculates the opening degree corresponding to the target effective opening area Secbvt, as the target opening BVt of the electric compressor bypass valve 45. The bypass valve opening degree control unit 158 controls the electric compressor valve driving motor 47 so that the actual opening degree BVr of the electric compressor bypass valve 45 approaches the target opening BVt.

2-5. Flowchart

The procedure of processing by the controller 100 (the control method of the engine 1) according to the present embodiment will be explained based on the flowcharts represented in FIGS. 7 through 10. The processing items represented in the flowcharts in FIGS. 7 through 10 are recurrently implemented every constant operation cycle while the computing processing unit 90 implements software (a program) stored in the storage apparatus 91.

At first, the flowchart in FIG. 7 will be explained. In the step S01, as mentioned above, the driving condition detection unit 110 implements a driving condition detection processing (a driving condition detection step) that detects the driving condition of the engine 1. The driving condition detection unit 110 detects the actual rotation speed Ner of the engine 1, the actual intake air flow rate Qar, and the actual atmospheric pressure P1r. In addition to the foregoing driving conditions, the driving condition detection unit 110 detects various kinds of driving conditions such as the actual intake air temperature T1r, the actual throttle opening degree THr, the actual manifold pressure Pbr, the exhaust gas air-fuel ratio AF, the actual supercharging pressure P2r, the accelerator opening degree D, the actual opening degree BVr of the electric compressor bypass valve, the actual intermediate supercharging pressure P12r, and the actual intermediate supercharging temperature T12r. Here, as described above, the driving condition detection unit 110 (the actual intake air flow rate calculation unit 141) implements an actual intake air flow rate calculation processing (an actual intake air flow rate calculation step) that calculates the actual intake air flow rate Qar. As mentioned above, the driving condition detection unit 110 (the actual in-cylinder fresh air amount calculation unit 142) implements an actual in-cylinder fresh air amount calculation processing (an actual in-cylinder fresh air amount calculation step) that calculates the actual charging efficiency Ecr and the actual in-cylinder fresh air amount Qcr, based on the output signal of the air flow sensor 12 or the manifold pressure sensor 15. And, as described above, the driving condition detection unit 110 (the estimated torque calculation unit 143) implements an estimated torque calculation processing (an estimated torque calculation step) that calculates the estimated output torque TRQr of the engine 1 or the estimated indicated mean effective pressure Pir.

Next, in the step S02, as described above, the intake air control unit 111 implements an intake air control processing (an intake air control step) that controls intake air of the engine 1. The intake air control unit 111 calculates the target intake air flow rate Qat and the target charging efficiency Ect. The details of the processing in the step S02 will be represented in the flowchart in FIG. 8. In the step S10, as described above, the demanded torque calculation unit 120 implements a demanded torque calculation processing (a demanded torque calculation step) that calculates the demanded output torque TRQd, based on the accelerator opening degree D, a demand from an external controller, and the like. Next, in the step S11, as described above, the target torque calculation unit 121 implements a target torque calculation processing (a target torque calculation step) that calculates the target output torque TRQt or the target indicated mean effective pressure Pit, based on the demanded output torque TRQd. Then, in the step S12, as described above, the target in-cylinder fresh air amount calculation unit 122 implements a target in-cylinder fresh air amount calculation processing (a target in-cylinder fresh air amount calculation step) that calculates the target charging efficiency Ect and the target in-cylinder fresh air amount Qct, based on the target output torque TRQt or the target indicated mean effective pressure Pit. In the step S13, as described above, the target intake air flow rate calculation unit 123 implements a target intake air flow rate calculation processing (a target intake air flow rate calculation step) that calculates the target intake air flow rate Qat, based on the target in-cylinder fresh air amount Qct. In the step S14, as described above, the throttle opening degree control unit 124 implements a throttle opening degree control processing (a throttle opening degree control step) that controls the throttle opening degree, based on the target intake air flow rate Qat.

Figure 7:
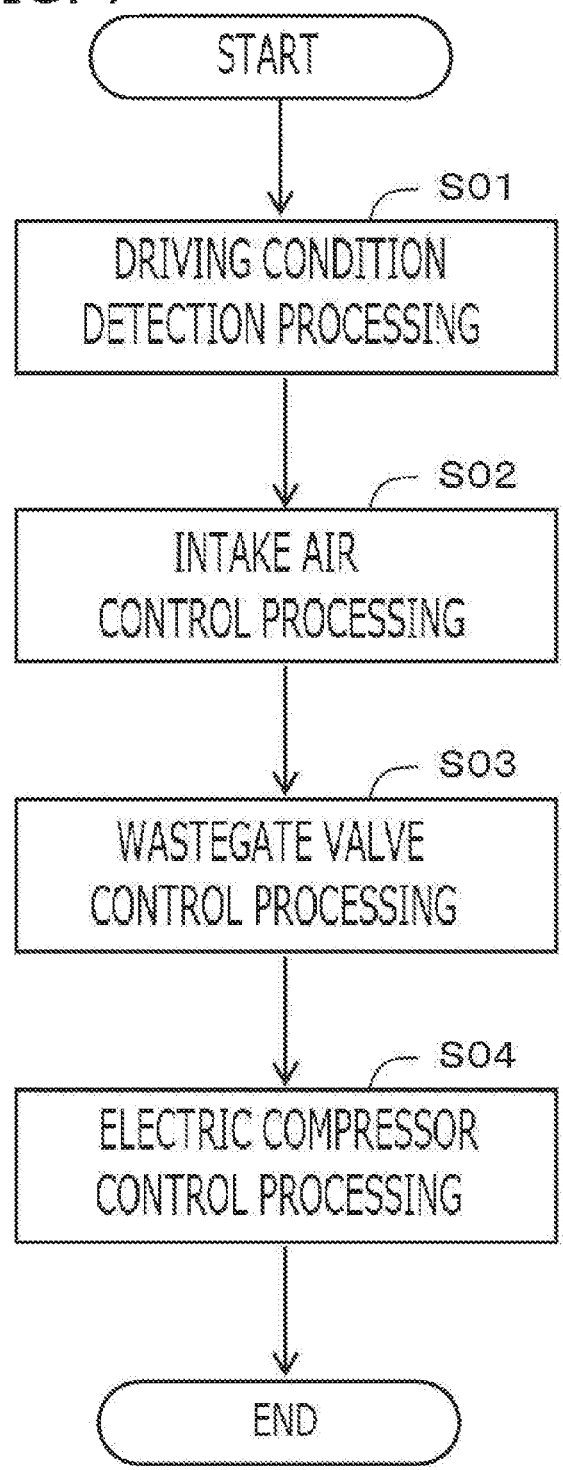
FIG. 7 is a flowchart representing the processing by the controller according to Embodiment 1 of the present invention.
Figure 8:
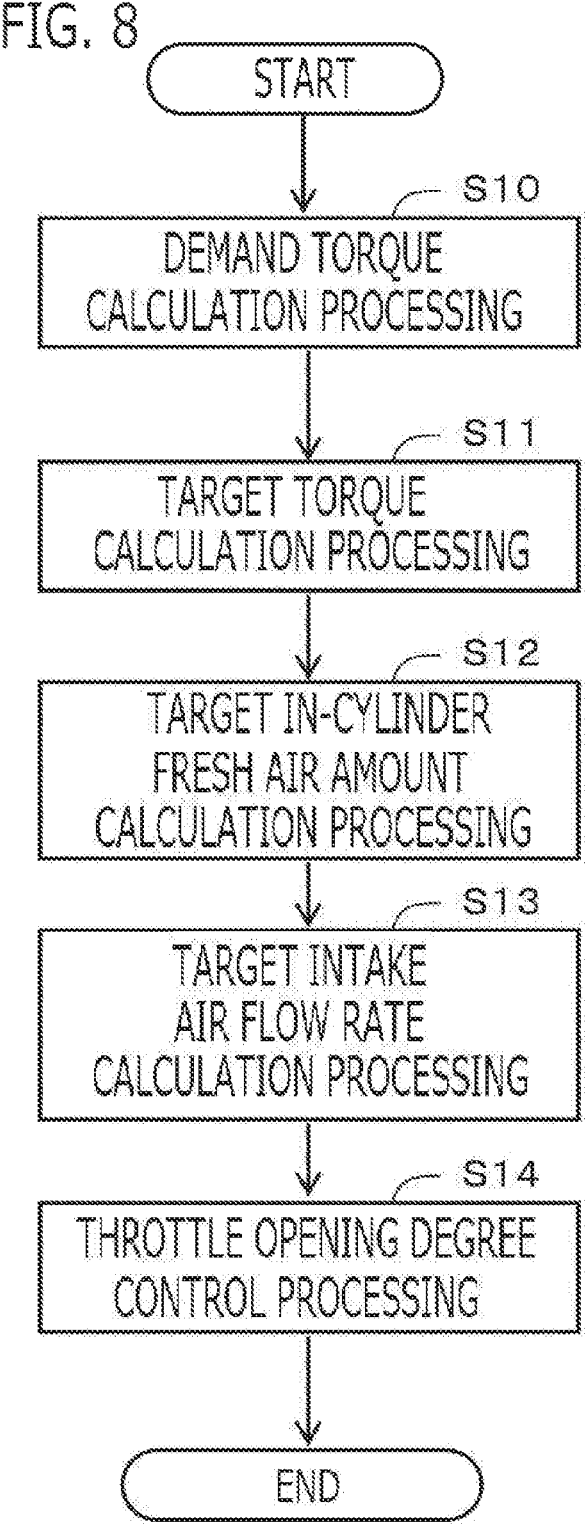
FIG. 8 is a flowchart representing the processing by an intake air control unit according to Embodiment 1 of the present invention.
Figure 9:
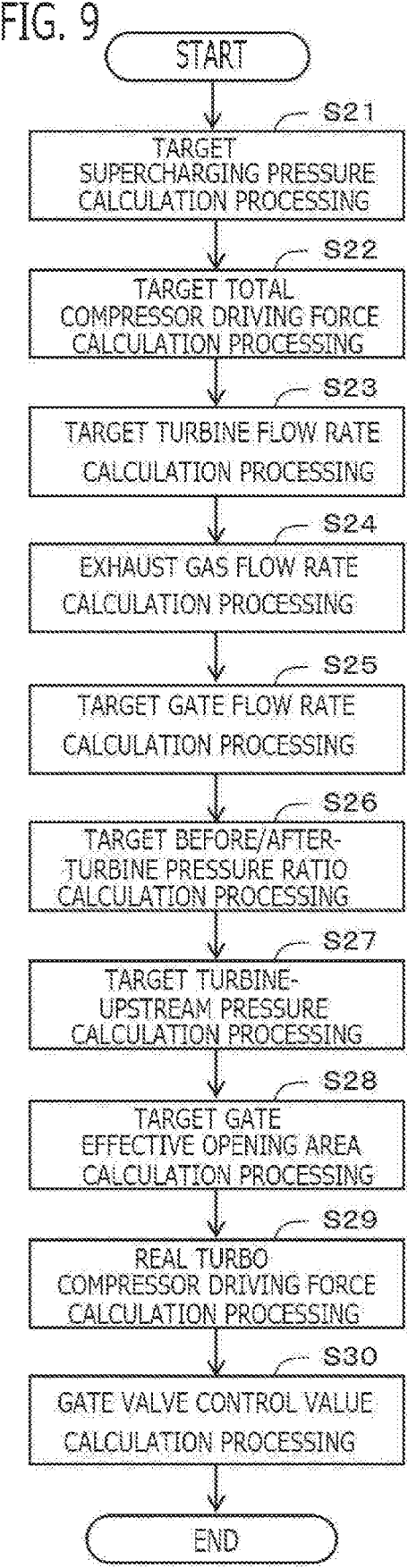
FIG. 9 is a flowchart representing the processing by a wastegate valve control unit according to Embodiment 1 of the present invention.

Next, in the step S03 in FIG. 7, as described above, the wastegate valve control unit 112 implements a wastegate valve control processing (a wastegate valve control step) that performs driving control of the wastegate valve 34 so as to control the supercharging pressure P2. The details of the processing in the step S03 will be represented in the flowchart in FIG. 9. In the step S21, as described above, the target supercharging pressure calculation unit 131 implements a target supercharging pressure calculation processing (a target supercharging pressure calculation step) that calculates the target supercharging pressure P2t, based on the target charging efficiency Ect and the actual rotation speed Ner. In the step S22, as described above, the target total compressor driving force calculation unit 132 implements a target total compressor driving force calculation processing (a target total compressor driving force calculation step) that calculates the target total compressor driving force Pct, based on the target intake air flow rate Qat calculated in the intake air control step and the target total before/after-compressor pressure ratio P2t/P1r, which is the pressure ratio of the target supercharging pressure P2t and the actual atmospheric pressure P1r.

In the step S23, as described above, the target turbine flow rate calculation unit 133 implements a target turbine flow rate calculation processing (a target turbine flow rate calculation step) that calculates the target turbine flow rate Qtt which realizes the target total compressor driving force Pct. In the step S24, as described above, the exhaust gas flow rate calculation unit 134 implements an exhaust gas flow rate calculation processing (an exhaust gas flow rate calculation step) that calculates the actual exhaust gas flow rate Qexr, based on the actual intake air flow rate Qar and the air-fuel ratio AF of the engine 1. In the step S25, as described above, the target gate flow rate calculation unit 135 implements a target gate flow rate calculation processing (a target gate flow rate calculation step) that calculates the target wastegate flow rate Qwgt, based on the actual exhaust gas flow rate Qexr and the target turbine flow rate Qtt. In the step S26, as described above, the target before/after-turbine pressure ratio calculation unit 136 implements a target before/after-turbine pressure ratio calculation processing (a target before/after-turbine pressure ratio calculation step) that calculates the target before/after-turbine P3t/P4t which realizes the target total compressor driving force Pct.

In the step S27, as described above, the target turbine-upstream pressure calculation unit 137 implements a target turbine-upstream pressure calculation processing (a target turbine-upstream pressure calculation step) that calculates the actual turbine-downstream pressure P4r, based on the actual exhaust gas flow rate Qexr, and then calculates the target turbine-upstream pressure P3t, based on the actual turbine-downstream pressure P4r and the target before/after-turbine pressure ratio P3t/P4t. In the step S28, as described above, the target gate effective opening area calculation unit 138 implements a target gate effective opening area calculation processing (a target gate effective opening area calculation step) that calculates the target gate effective opening area Swgt, based on the target wastegate flow rate Qwgt, the target before/after-turbine pressure ratio P3t/P4t, and the target turbine-upstream pressure P3t.

In the step S29, as described above, the actual turbo compressor driving force calculation unit 140 implements an actual turbo compressor driving force calculation processing (an actual turbo compressor driving force calculation step) that calculates the actual turbo compressor driving force Pcr, based on the actual intake air flow rate Qar, and the actual before/after-turbo compressor pressure ratio P2r/P12r which is the pressure ratio of the actual supercharging pressure P2r and the actual intermediate supercharging pressure P12r.

In the step S30, as described above, the gate valve control value calculation unit 139 implements a gate valve control value calculation processing (a gate valve control value calculation step) that calculates the gate valve control value WG based on the target gate effective opening area Swgt.

Next, in the step S04 in FIG. 7, as described above, the electric compressor control unit 113 implements an electric compressor control processing (an electric compressor control step) that performs driving control of the compressor driving motor 43 and the electric compressor valve actuator 47, in order to control the intermediate supercharging pressure P12.

Figure 10:
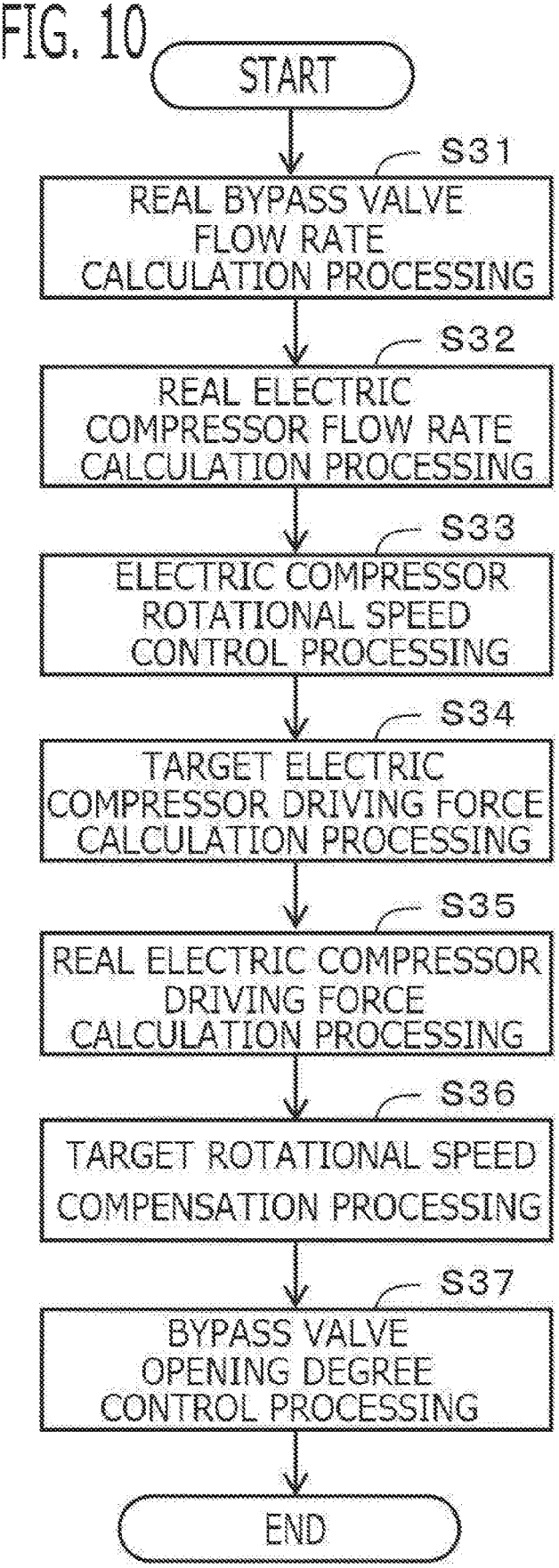
FIG. 10 is a flowchart representing the processing by an electric compressor control unit according to Embodiment 1 of the present invention.

The details of the processing in the step S04 will be represented in the flowchart in FIG. 10. In the step S31, as described above, the actual bypass valve flow rate calculation unit 156 implements an actual bypass valve flow rate calculation processing (an actual bypass valve flow rate calculation step) that calculates the actual bypass valve passing air flow rate Qecbvr, based on the actual opening degree BVr of the electric compressor bypass valve 45, and the actual before/after-electric compressor pressure ratio P12r/P1r which is the pressure ratio of the actual atmospheric pressure P1r and the actual intermediate supercharging pressure P12r. In the step S32, as described above, the actual electric compressor flow rate calculation unit 157 implements an actual electric compressor flow rate calculation processing (an actual electric compressor flow rate calculation step) that calculates the value obtained by subtracting the actual bypass valve passing air flow rate Qecbvr from the actual intake air flow rate Qar, as the actual passing air flow rate Qecmpr of the electric compressor 42.

In the step S33, as described above, the electric compressor rotational speed control unit 151 (a basic target rotational speed calculation unit 152) implements an electric compressor rotational speed control processing (an electric compressor rotational speed control step) that calculates the value obtained by subtracting, from the target supercharging pressure P2t, the pressure difference obtained by subtracting the actual intermediate supercharging pressure P12r from the actual supercharging pressure P2r, as the target intermediate supercharging pressure P12t; calculates the target before/after-electric compressor pressure ratio P12t/P1r which is the ratio of the target intermediate supercharging pressure P12t and the actual atmospheric pressure P1r; calculates the target rotational speed of the electric compressor 42, based on the target before/after-electric compressor pressure ratio P12t/P1r and the actual intake air flow rate Qar (in this example, the actual passing air flow rate Qecmpr of the electric compressor 42); and controls the compressor driving motor 43 so that the rotational speed of the electric compressor 42 approaches the target rotational speed of the electric compressor 42.

In the step S34, as described above, the target electric compressor driving force calculation unit 153 implements a target electric compressor driving force calculation processing (a target electric compressor driving force calculation step) that calculates the value obtained by subtracting the actual turbo compressor driving force Pcr from the target total compressor driving force Pct, as the target electric compressor driving force Pecpt. In the step S35, as described above, the actual electric compressor driving force calculation unit 154 implements an actual electric compressor driving force calculation processing (real electric compressor driving force calculation step) that calculates the actual electric compressor driving force Pecpr, based on the actual intake air flow rate Qar (in this example, the actual passing air flow rate Qecmpr of the electric compressor 42), and the actual before/after-electric compressor pressure ratio P12r/P1r which is the pressure ratio of the actual atmospheric pressure P1r and the actual intermediate supercharging pressure P12r. In the step S36, the target rotational speed correction unit 155 implements a target rotational speed compensation process (a target rotational speed correction step) that corrects the target rotational speed of the electric compressor, based on the driving force difference between the target electric compressor driving force Pecpt and the actual electric compressor driving force Pecpr.

In the step S37, the bypass valve opening degree control unit 158 implements a bypass valve opening degree control processing (a bypass valve opening degree control step) that performs driving control of the electric compressor valve actuator 47, and changes the opening degree of the electric compressor bypass valve 45. In the present embodiment, in the case other than the case of performing supercharging by the electric compressor 42, the bypass valve opening degree control unit 158 controls the electric compressor valve actuator 47 to open the electric compressor bypass valve 45. As described above, in order to compensate shortage of the actual passing air flow rate Qecmpr of the electric compressor 42 to the target intake air flow rate Qat, the bypass valve opening degree control unit 158 performs control which opens the effective opening area of the electric compressor bypass valve 45 in accordance with this shortage.

Various modifications and alterations of this invention will be apparent to those skilled in the art without departing from the scope and spirit of this invention, and it should be understood that this is not limited to the illustrative embodiments set forth herein.

What is claimed is:

1. A controller for a supercharger-equipped internal combustion engine that is provided with a turbocharger which has a turbine provided in an exhaust path and a turbo compressor which is provided at the upstream side of a throttle valve in an intake path and rotates integrally with the turbine, and an electric supercharger which has an electric compressor provided at the upstream side of the turbo compressor in the intake path and an electric motor which drives the electric compressor, the controller for the supercharger-equipped internal combustion engine comprising:
a processor configured to implement:
a driving condition detection unit that detects an intake air flow rate which flows through the intake path, an atmospheric pressure, an intermediate supercharging pressure which is a pressure at the downstream side of the electric compressor and at the upstream side of the turbo compressor in the intake path, and a supercharging pressure which is a pressure at the downstream side of the turbo compressor and at the upstream side of the throttle valve in the intake path;
a target supercharging pressure calculation unit that calculates a target value of the supercharging pressure; and an electric compressor rotational speed control unit that calculates,
as a target value of the intermediate supercharging pressure, a value obtained by subtracting, from the target value of the supercharging pressure, a pressure difference obtained by subtracting a detection value of the intermediate supercharging pressure from a detection value of the supercharging pressure;
calculates a target before/after-electric compressor pressure ratio which is a ratio of the target value of the intermediate supercharging pressure and a detection value of the atmospheric pressure;
calculates a target rotational speed of the electric compressor based on the target before/after-electric compressor pressure ratio and a detection value of the intake air flow rate; and control the electric motor so that a rotational speed of the electric compressor approaches the target rotational speed of the electric compressor.

2. The controller for the supercharger-equipped internal combustion engine according to claim 1, wherein, by use of a rotational speed characteristic in which a relationship among a before/after-electric compressor pressure ratio which is a pressure ratio of upstream and downstream of the electric compressor, a passing air flow rate of the electric compressor, and the rotational speed of the electric compressor is preliminarily set, the electric compressor rotational speed control unit calculates, as the target rotational speed of the electric compressor, the rotational speed of the electric compressor corresponding to the detection value of the target before/after-electric compressor pressure ratio and the detection value of the intake air flow rate.

3. The controller for the supercharger-equipped internal combustion engine according to claim 1, wherein the processor is further configured to implement:
a target intake air flow rate calculation unit that calculates a target value of the intake air flow rate;
a target total compressor driving force calculation unit that calculates a target total compressor driving force which is a target value of a total driving force summing a driving force of the turbo compressor and a driving force of the electric compressor, based on the target value of the intake air flow rate, and a pressure ratio between the target value of the supercharging pressure and the detection value of the atmospheric pressure;
an actual turbo compressor driving force calculation unit that calculates an actual value of the driving force of the turbo compressor, based on the detection value of the intake air flow rate, and a pressure ratio between the detection value of the intermediate supercharging pressure and the detection value of the supercharging pressure;
a target electric compressor driving force calculation unit that calculates a value obtained by subtracting the actual value of the driving force of the turbo compressor from the target total compressor driving force, as a target value of the driving force of the electric compressor;
an actual electric compressor driving force calculation unit that calculates an actual value of the driving force of the electric compressor, based on the detection value of the intake air flow rate, and a pressure ratio between the detection value of the atmospheric pressure and the detection value of the intermediate supercharging pressure; and
a target rotational speed correction unit that corrects the target rotational speed of the electric compressor, based on a driving force difference between the target value of the driving force of the electric compressor and the actual value of the driving force of the electric compressor.

4. The controller for the supercharger-equipped internal combustion engine according to claim 1, wherein the electric supercharger further includes an electric compressor bypass which bypasses the electric compressor, an electric compressor bypass valve which opens and closes the electric compressor bypass, and an electric compressor valve actuator which drives the electric compressor bypass valve, and
the processor is further configured to implement a bypass valve opening degree control unit that controls the electric compressor valve actuator to open the electric compressor bypass valve except when performing supercharging by the electric compressor.

5. The controller for the supercharger-equipped internal combustion engine according to claim 4, wherein the processor is further configured to implement:
an actual law pass valve flow rate calculation unit that calculates an actual value of a passing air flow rate of the electric compressor bypass valve, based on a detection value of an opening degree of the electric compressor bypass valve detected by the driving condition detector, and a pressure ratio between the detection value of the atmospheric pressure and the detection value of the intermediate supercharging pressure; and
an actual electric compressor flow rate calculation unit that calculates a value obtained by subtracting the actual value of the passing air flow rate of the electric compressor bypass valve from the detection value of the intake air flow rate, as an actual value of a passing air flow rate of the electric compressor;
wherein the electric compressor rotational speed control unit uses the actual value of the passing air flow rate of the electric compressor as the detection value of the intake air flow rate to calculate the target rotational speed of the electric compressor, based on the target before/after-electric compressor pressure ratio and the actual value of the passing air flow rate of the electric compressor.

6. The controller for the supercharger-equipped internal combustion engine according to claim 1, wherein
the turbocharger further includes a turbine bypass which bypasses the turbine, a wastegate valve which opens and closes the turbine bypass, and a gate valve actuator which drives the wastegate valve, and the processor is further configured to implement:
a target intake air flow rate calculation unit that calculates a target value of the intake air flow rate;
a target total compressor driving force calculation unit that calculates a target total compressor driving force which is a target value of a total driving force summing a driving force of the turbo compressor and a driving force of the electric compressor, based on the target value of the intake air flow rate, and a pressure ratio between the target value of the supercharging pressure and the detection value of the atmospheric pressure;
a target turbine flow rate calculation unit that calculates a target value of the turbine flow rate which is an exhaust gas flow rate flowing into the turbine, which realizes the target total compressor driving force;
an exhaust gas flow rate calculation unit that calculates an actual value of an exhaust gas flow rate, based on the detection value of the intake air flow rate, and an air-fuel ratio of the internal combustion engine;
a target gate flow rate calculation unit that calculates a value obtained by subtracting the target value of the turbine flow rate from the actual value of the exhaust gas flow rate, as a target value of a wastegate flow rate which is an exhaust gas flow rate, which flows through the wastegate valve;
a target before/after-turbine pressure ratio calculation unit that calculates a target value of a before/after-turbine pressure ratio which is a pressure ratio of upstream and downstream of the turbine, which realizes the target total compressor driving force;
a target turbine upstream pressure calculation unit that calculates an actual value of a downstream pressure of the turbine based on the actual value of the exhaust gas flow rate, and calculates a target value of an upstream pressure of the turbine based on the actual value of the downstream pressure of the turbine and the target value of the before/after-turbine pressure ratio;
a target gate effective opening area calculation unit that calculates a target value of an effective opening area of the wastegate valve, based on the target value of the wastegate flow rate, the target value of the before/after-turbine pressure ratio, and the target value of the upstream pressure of the turbine; and
a gate valve control value calculation unit that calculates a control value of the gate valve actuator, based on the target value of the effective opening area.

7. A control method for a supercharger-equipped internal combustion engine that is provided with a turbocharger which has a turbine provided in an exhaust path and a turbo compressor which is provided at the upstream side of a throttle valve in an intake path and rotates integrally with the turbine, and an electric supercharger which has an electric compressor provided at the upstream side of the turbo compressor in the intake path and an electric motor which drives the electric compressor, the control method for the supercharger-equipped internal combustion engine comprising:
detecting an intake air flow rate which flows through the intake path, an atmospheric pressure, an intermediate supercharging pressure which is a pressure at the downstream side of the electric compressor and at the upstream side of the turbo compressor in the intake path, and a supercharging pressure which is a pressure at the downstream side of the turbo compressor and at the upstream side of the throttle valve in the intake path;
calculating a target value of the supercharging pressure;
calculating, as a target value of the intermediate supercharging pressure, a value obtained by subtracting, from the target value of the supercharging pressure, a pressure difference obtained by subtracting a detection value of the intermediate supercharging pressure from a detection value of the supercharging pressure;
calculating a target before/after-electric compressor pressure ratio which is a ratio of the target value of the intermediate supercharging pressure and a detection value of the atmospheric pressure;
calculating a target rotational speed of the electric compressor based on the target before/after-electric compressor pressure ratio and a detection value of the intake air flow rate; and
controlling the electric motor so that a rotational speed of the electric compressor approaches the target rotational speed of the electric compressor.

\* \* \* \* \*